(12) United States Patent
Saleri et al.

(10) Patent No.: US 10,915,847 B1
(45) Date of Patent: Feb. 9, 2021

(54) PETROLEUM RESERVOIR OPERATION USING RESERVES RANKING ANALYTICS

(71) Applicant: QRI GROUP, LLC, Houston, TX (US)

(72) Inventors: Nansen G. Saleri, Houston, TX (US); Robert M. Toronyi, Danville, CA (US)

(73) Assignee: QRI GROUP, LLC, Houston, TX (US)

(*) Notice: Subject to any disclaimer, the term of this patent is extended or adjusted under 35 U.S.C. 154(b) by 218 days.

(21) Appl. No.: 15/914,712

(22) Filed: Mar. 7, 2018

Related U.S. Application Data

(63) Continuation of application No. 15/299,828, filed on Oct. 21, 2016, now Pat. No. 9,946,986, which is a continuation-in-part of application No. 13/282,272, filed on Oct. 26, 2011, now abandoned.

(51) Int. Cl.
    G06Q 10/06 (2012.01)
    G06Q 50/02 (2012.01)

(52) U.S. Cl.
    CPC ....... *G06Q 10/06393* (2013.01); *G06Q 50/02* (2013.01)

(58) Field of Classification Search
    None
    See application file for complete search history.

(56) References Cited

U.S. PATENT DOCUMENTS

| | | | |
|---|---|---|---|
| 3,035,440 A | 5/1962 | Reed | |
| 5,984,010 A | 11/1999 | Elias et al. | |
| 6,101,447 A | 8/2000 | Poe | |
| 6,401,547 B1 | 6/2002 | Hatfield | |
| 7,079,952 B2 | 7/2006 | Thomas et al. | |
| 7,289,942 B2 | 10/2007 | Yang et al. | |
| 7,445,041 B2 | 11/2008 | O'Brien | |
| 7,556,099 B2 | 7/2009 | Arthur et al. | |
| 7,798,219 B1 | 9/2010 | Harnoy | |
| 7,890,264 B2 | 2/2011 | Elphic | |

(Continued)

FOREIGN PATENT DOCUMENTS

| | | |
|---|---|---|
| CN | 1209860 | 3/1999 |
| CN | 1664575 | 9/2005 |

OTHER PUBLICATIONS

Society of Petroleum Engineers; "Petroleum Resources Management System"; SPE / World Petroleum Council; Published Apr. 2007. (Year: 2007).*

(Continued)

*Primary Examiner* — Garald J. O'Connor
*Assistant Examiner* — Abhijit B Sadananda
(74) *Attorney, Agent, or Firm* — Workman Nydegger

(57) ABSTRACT

A method of improving operation of a petroleum reservoir using geotechnical and economic analysis includes classifying a petroleum reservoir using reserves ranking analytics (RRA) and then making one or modifications to the operation of the reservoir. RRA classification includes establishing reservoir classification metrics for each of the following categories: 1) resource size; 2) recovery potential; and 3) profitability. The reservoir can be classified based on at least one metric in the profitability classification category, and also based on at least one metric in one or more of the resource size classification category or the recovery potential classification category. Classification of reservoirs according to RRA can aid in reservoir management, planning, and development.

19 Claims, 11 Drawing Sheets

(56) References Cited

U.S. PATENT DOCUMENTS

| | | | |
|---|---|---|---|
| 7,953,327 | B2 | 5/2011 | Pereira et al. |
| 7,963,327 | B1 | 6/2011 | Saleri et al. |
| 8,145,427 | B1 | 3/2012 | Saleri et al. |
| 8,145,428 | B1 | 3/2012 | Saleri et al. |
| 8,195,401 | B2 | 6/2012 | Ella et al. |
| 8,209,202 | B2 | 6/2012 | Narayanan et al. |
| 8,396,826 | B2 | 3/2013 | Mijares et al. |
| 8,880,422 | B1 | 11/2014 | Lehmann et al. |
| 9,710,766 | B2 | 7/2017 | Saleri et al. |
| 9,767,421 | B2 | 9/2017 | Saleri et al. |
| 9,940,724 | B2 | 4/2018 | Jia et al. |
| 9,946,986 | B1 | 4/2018 | Saleri et al. |
| 10,329,881 | B1 | 6/2019 | Saleri et al. |
| 10,477,157 | B1 | 11/2019 | Shahdi et al. |
| 2001/0015133 | A1 | 8/2001 | Sakai et al. |
| 2001/0037983 | A1 | 11/2001 | Takahashi et al. |
| 2002/0013687 | A1 | 1/2002 | Ortoleva |
| 2002/0120429 | A1 | 8/2002 | Ortoleva |
| 2002/0165671 | A1 | 11/2002 | Middya |
| 2002/0167314 | A1 | 11/2002 | Prammer |
| 2003/0225606 | A1 | 12/2003 | Raghuraman et al. |
| 2004/0015376 | A1 | 1/2004 | Zhu et al. |
| 2004/0153437 | A1 | 8/2004 | Buchan |
| 2004/0158406 | A1 | 8/2004 | Harrison |
| 2004/0220846 | A1* | 11/2004 | Cullick .............. G06Q 10/06 705/7.22 |
| 2005/0038603 | A1 | 2/2005 | Thomas et al. |
| 2005/0149307 | A1 | 7/2005 | Gurpiner et al. |
| 2005/0209912 | A1 | 9/2005 | Venningen et al. |
| 2006/0224369 | A1 | 10/2006 | Yang et al. |
| 2006/0289157 | A1 | 12/2006 | Rao |
| 2007/0016389 | A1 | 1/2007 | Ozgen |
| 2007/0028417 | A1 | 2/2007 | Emmitt |
| 2007/0118346 | A1 | 5/2007 | Wen et al. |
| 2007/0143025 | A1 | 6/2007 | Valdez et al. |
| 2007/0156377 | A1 | 7/2007 | Gurpinar |
| 2007/0179768 | A1 | 8/2007 | Cullick et al. |
| 2007/0183604 | A1 | 8/2007 | Araki et al. |
| 2007/0284107 | A1 | 12/2007 | Crichlow |
| 2008/0052097 | A1 | 2/2008 | Bouzas et al. |
| 2008/0065363 | A1 | 3/2008 | Middya |
| 2008/0091283 | A1 | 4/2008 | Balci et al. |
| 2008/0252898 | A1 | 10/2008 | Pfaff |
| 2008/0262898 | A1 | 10/2008 | Tonchev et al. |
| 2009/0005630 | A1 | 1/2009 | Yokoyama et al. |
| 2009/0037115 | A1 | 2/2009 | Magill et al. |
| 2009/0084545 | A1* | 4/2009 | Banerjee .............. E21B 43/00 166/250.15 |
| 2009/0133871 | A1 | 5/2009 | Skinner et al. |
| 2009/0313772 | A1 | 12/2009 | Talley |
| 2010/0042458 | A1 | 2/2010 | Rashid et al. |
| 2010/0057418 | A1 | 3/2010 | Li et al. |
| 2010/0082142 | A1 | 4/2010 | Usadi et al. |
| 2010/0204972 | A1 | 8/2010 | Hsu et al. |
| 2010/0300682 | A1 | 12/2010 | Thakur et al. |
| 2011/0014088 | A1 | 1/2011 | Zubrin et al. |
| 2011/0054869 | A1 | 3/2011 | Li |
| 2011/0067443 | A1 | 3/2011 | Martinez et al. |
| 2011/0130966 | A1 | 6/2011 | Zhan et al. |
| 2011/0168391 | A1 | 7/2011 | Saleri et al. |
| 2011/0290479 | A1 | 12/2011 | Izgec |
| 2011/0295656 | A1 | 12/2011 | Venkatasubramanian |
| 2012/0101759 | A1 | 4/2012 | Rai et al. |
| 2012/0232865 | A1 | 9/2012 | Maucec et al. |
| 2012/0292055 | A1 | 11/2012 | Swist |
| 2013/0048279 | A1 | 2/2013 | Appel et al. |
| 2013/0110474 | A1 | 5/2013 | Saleri |
| 2013/0110524 | A1 | 5/2013 | Saleri et al. |
| 2013/0110563 | A1 | 5/2013 | Saleri |
| 2013/0110571 | A1 | 5/2013 | Saleri et al. |
| 2013/0151159 | A1 | 6/2013 | Pomerantz et al. |
| 2013/0161502 | A1 | 6/2013 | Pomerantz et al. |
| 2013/0218538 | A1 | 8/2013 | Fuecker et al. |
| 2013/0271757 | A1 | 10/2013 | Kang et al. |
| 2013/0338987 | A1 | 12/2013 | Cheng et al. |
| 2014/0310071 | A1 | 10/2014 | Conradson |
| 2015/0269438 | A1 | 9/2015 | Samarasekera et al. |
| 2015/0337631 | A1 | 11/2015 | Matringe et al. |
| 2015/0346010 | A1 | 12/2015 | Matringe et al. |
| 2017/0335665 | A1 | 11/2017 | Saleri |
| 2018/0053055 | A1 | 2/2018 | Finding et al. |
| 2018/0053352 | A1 | 2/2018 | Finding et al. |
| 2018/0075605 | A1 | 3/2018 | Jia et al. |
| 2018/0190017 | A1 | 7/2018 | Mendez et al. |
| 2018/0197297 | A1 | 7/2018 | Jia et al. |
| 2018/0315222 | A1 | 11/2018 | Jones |
| 2018/0315232 | A1 | 11/2018 | Jones et al. |
| 2019/0103005 | A1 | 4/2019 | Gilberton et al. |
| 2019/0220002 | A1 | 7/2019 | Huang et al. |
| 2020/0293828 | A1 | 9/2020 | Wang et al. |
| 2020/0294257 | A1 | 9/2020 | Yoo et al. |

OTHER PUBLICATIONS

Graf, T., Zangl, G., May, R., Hartlieb, M., Randle, J., Al-Kinani, A. "Candidate Selection Using Stochastic Reasoning Driven by Surrogate Reservoir Models." Society of Petroleum Engineers, Document No. SPE-136373, SPE Reservoir Evaluation and Engineering, Aug. 2011, pp. 433-442. (Year: 2011).*

Rivas, O., Sonia Embid, S., Bolivar, F. "Ranking Reservoirs for Carbon Dioxide Flooding Processes." SPE Advanced Technology Series, vol. 2 No. 1, Society of Petroleum Engineers, 1994, pp. 95-103 (Year: 1994).*

Committee on Advanced Drilling Technologies, National Research Council. "Drilling and Excavation Technologies for the Future." The National Academic Press, 1994. (Year: 1994).*

Zhang, Guohong. Estimating Uncertainties in Integrated Reservoir Studies. Dec. 2003. Texas A&M University, PhD dissertation. (Year: 2003).*

Abbaszadeh, M., Corbett, C., Broetz, R., Wang, J., Xue, F., Nitka, T., Zhang, Y., Liu, Z.Y. "Development of an Integrated Reservoir Model for a Naturally Fractured Volcanic Reservoir in China." SPE Reservoir Evaluation and Engineering, Oct. 2001, pp. 406-414. (Year: 2001).*

International Search Report cited in PCT/US2011/030940 dated Jan. 11, 2012.

U.S. Appl. No. 14/836,564, filed Aug. 26, 2015, Mondal et al.
U.S. Appl. No. 12/915,278, filed Oct. 29, 2010, Saleri.
U.S. Appl. No. 12/606,027, filed Oct. 26, 2009, Saleri.
U.S. Appl. No. 13/282,272, filed Oct. 26, 2011, Saleri.
U.S. Appl. No. 15/914,712, filed Mar. 7, 2018, Saleri.
U.S. Appl. No. 15/618,890, filed Jun. 9, 2017, Matringe.
U.S. Appl. No. 15/359,604, filed Mar. 20, 2019, Vajargah.
U.S. Appl. No. 16/389,086, filed Apr. 19, 2019, Benhallam.
U.S. Appl. No. 16/373,053, filed Apr. 2, 2019, Zhai.
U.S. Appl. No. 16/448,594, filed Jun. 21, 2019, Toronyi.

Batavia, "Front-End Loading for Life Cycle Success", Offshore Technology Conference Paper No. OTC-12980; Published Apr. 2001.

BDM-Oklahoma, Inc., "Feasability Study of Heavy Oil Recovery in the United States", U.S. Department of Energy, Document No. NIPER/BDM-0225; Published Mar. 1995.

Burns et al., "Gas Field Development: Automatic Selection of Locations for New Producing Wells", Society of Petroleum Engineers, Document No. SPE-2429; Published 1969.

Fiksel et al., "Measuring Progress Towards Sustainability Principles, Process, and Best Practices", 1999 Greening of Industry Network Conference Best Practice Proceedings.

Freudenrich, Ph.D., Craig, and Jonathan Strickland, "How Oil Drilling Works" Apr. 12, 2001. HowStuffWorks.com retrieved from WayBack Machine, http://web.archive.org/web/20060418040616/http://science.howstuffworks.com/oil-drilling.htm/printable.

Graf et al., "Candidate Selection Using Stochastic Reasoning Driven by Surrogate Reservoir Models"; Society of Petroleum Engineers, Document No. SPE-136373; SPE Reservoir Evaluation and Engineering; Published Aug. 2011; p. 433-442.

Ham, Jerry, Ranking of Texas Reservoirs for Application of Carbon Dioxide Miscible Displacement, Apr. 1996.

(56) References Cited

OTHER PUBLICATIONS

Helman, "The Octopus", Forbes Energy & Genius, pp. 454-51, Nov. 24, 2008.
Investopedia.com, "What are leading, lagging, and coincident indicators? What are they for?", http://www.investopedia.com/ask/answers/177.asp, retrieved on Feb. 27, 2012.
Investorwords.com, "lagging indicator", "leading indicator", http://www.investorwords.com/2713/lagging_indicator.html, http://www.investorwords.com/2741/leading_indicator.html.
Izgec et al, "Quantifying Reservoir Connectivity, In-Place Volumes, and Drainage-Area Pressures during Primary Depletion"; Elsevier, 2009; Journal of Petroleum Science and Engineering, vol. 69; p. 7-17.
Sayarpour et al., "The use of capacitance-resistance models for rapid estimation of waterflood performance and optimization", Journal of Petroleum Science and Engineering, 69 (2009, 227-238).
Schlumberger.com retrieved from WayBack Machine, http://web.archive.org/web/20071230014516/http://www.slb.com/.
Slide from 2003 Presentation by Joe Ault.
Smalley et al., "Reservoir Compartmentalization Assessed with Fluid Compositional Data", Society of Petroleum Engineers, Aug. 1994; SPE Reservoir Engineering, vol. 9 Is. 3; p. 175-180.
Society of Petroleum Engineers, "Petroleum Resources Management System"; SPE/World Petroleum Council; Published Apr. 2007.
Society of Petroleum Engineers, "Guidelines for the Evaluation of Petroleum Reserves and Resources"; SPE in associate with World Petroleum Congresses and American Association of Petroleum Geologists, 2001; pp. 1-139.
U.S. Appl. No. 12/392,891, filed Feb. 25, 2009, Office Action dated Dec. 8, 2010.
U.S. Appl. No. 12/392,891, filed Feb. 25, 2009, Notice of Allowance dated Mar. 24, 2011.
U.S. Appl. No. 12/606,027, filed Oct. 26, 2009, Office Action dated Aug. 10, 2011.
U.S. Appl. No. 12/915,278, filed Oct. 29, 2010, Office Action dated Nov. 7, 2011.
U.S. Appl. No. 12/567,361, filed Sep. 25, 2009, Office Action dated Nov. 30, 2011.
U.S. Appl. No. 12/567,404, filed Sep. 29, 2009, Office Action dated Dec. 8, 2011.
U.S. Appl. No. 12/606,027, filed Oct. 26, 2009, Final Office Action dated Jan. 19, 2012.
U.S. Appl. No. 12/567,361, filed Sep. 25, 2009, Notice of Allowance dated Feb. 2, 2012.
U.S. Appl. No. 12/567,404, filed Sep. 25, 2009, Notice of Allowance dated Feb. 7, 2012.
U.S. Appl. No. 12/915,278, filed Oct. 29, 2010, Final Office Action dated Mar. 1, 2012.
U.S. Appl. No. 13/282,297, filed Oct. 26, 2011, Office Action dated Apr. 1, 2013.
U.S. Appl. No. 13/282,297, filed Oct. 26, 2011, Final Office Action dated Sep. 11, 2013.
U.S. Appl. No. 13/282,297, filed Oct. 26, 2011, Advisory Action dated Nov. 18, 2013.
U.S. Appl. No. 14/836,564, filed Aug. 26, 2015, Final Office Action dated Feb. 15, 2019.
U.S. Appl. No. 14/836,564, filed Aug. 26, 2015, Notice of Allowance dated Nov. 20, 2019.
U.S. Appl. No. 15/618,890, filed Jun. 9, 2017, Office Action dated Mar. 4, 2019.
U.S. Appl. No. 15/618,890, filed Jun. 9, 2017, Notice of Allowanced dated Jun. 24, 2019.
Cordazzo et al., "Interblock Transmissibility Calculation Analysis for Petroleum Reservoir Simulation", Federal University of Santa Catarina, Nov. 2002, pp. 1-18.
Final Office Action received for U.S. Appl. No. 13/282,315, dated Jun. 25, 2015.
Jerry Ham, "Ranking of Texas Reservoirs for Application of Carbon Dioxide Miscible Displacement", Apr. 1996.
Investorwords.com, "lagging indiciator", "leading indicator", http://www.investorwords.com/2713/lagging_indicator.html, http://www.investorwords.com/2741/leading indicator.html.
McElroy, "Transient Pressure Analysis in Strip Reservoirs with Linear Skin Discontinuities", Stanford University, 1986, p. 1-58.
Office Action received for U.S. Appl. No. 13/282,282, dated May 11, 2015.
Sayarpour M, Zuluaga E, Kabir C S, et al. The use of capacitance-resistance models for rapid estimation of waterflood performance and optimization. Journal of Petroleum Science and Engineering, 2009, 69(3/4): 227-238.
Slide from Presentation by Inventor Joe Ault (2003).
U.S. Appl. No. 15/408,397, filed Jan. 17, 2016, Saleri et al.
U.S. Appl. No. 15/618,399, filed Jun. 9, 2017, Saleri et al.
U.S. Appl. No. 15/299,298, filed Oct. 21, 2016, Saleri et al.
U.S. Appl. No. 15/299,828, filed Oct. 21, 2016, Saleri et al.
U.S. Appl. No. 13/282,282, filed Oct. 26, 2011, Notice of Allowance dated Mar. 16, 2017.
Yin "Geomechanics—Reservoir Modeling by Displacement Discontinuity—Finite Element Method" University of Waterloo, 2008, p. 1-141.
Jolley et al., Reservoir Compartmentalization: An Introduction; Reservoir Compartmentalization; The Geological Society of London, 2010; Special Publications vol. 347; pp. 1-8.
Kabir et al., "Diagnosis and Reservoir Compartmentalization from Measured Pressure/Rate Data during Primary Depletion"; Elsevier, 2009; Journal of Petroleum Science and Engineering, vol. 69, pp. 271-282.
"The Report of The BP U.S. Refineries Independent Safety Review Panel", Jan. 2007.
Rivas et al., "Ranking Reservoirs for Carbon Dioxide Flooding Processes", 1994.
Saleri et al., "Data and Data Hierarchy", SPE 21369, pp. 1286-1293, Dec. 1992.
Saleri, "Dawn in the Desert: Saudi High Tech Paying Off at Ghawar", Energy Tribune, pp. 15-17, Sep. 2007.
Saleri et al., "Engineering Control in Reservoir Simulation: Parts I and II", SPE 18305, 1988.
Saleri et al., "The Expanding Role of the Drill Bit in Shaping the Subsurface", JPT, pp. 53-58, Dec. 2003.
Saleri, "Haradh III: A Milestone for Smart Fields", JPT, Nov. 2006.
Saleri, "'Learning' Reservoirs: Adapting to Disruptive Technologies", JPT, pp. 57-60, Mar. 2002.
Saleri, "The Next Trillion: Anticipating and Enabling Game-Changing Recoveries", JPT, Apr. 2006.
Saleri, "Reservoir Management Tenets: Why They Matter to Sustainable Supplies", JPT, pp. 28-30, Jan. 2005.
Saleri, "Reservoir Performance Forecasting: Acceleration by Parallel Planning", JPT, pp. 652-657, Jul. 1993.
Saleri, "Tenets and Diagnostics in Modern Reservoir Management", 8th International Forum on Reservoir Simulation, Jun. 2005, Stressa, Italy.
U.S. Appl. No. 13/282,272, filed Oct. 26, 2011, Office Action dated Mar. 27, 2014.
U.S. Appl. No. 13/282,282, filed Oct. 26, 2011, Office Action dated Mar. 27, 2014.
U.S. Appl. No. 13/282,315, filed Oct. 26, 2011, Office Action dated Aug. 18, 2014.
U.S. Appl. No. 13/282,272, filed Oct. 26, 2011, Office Action dated Nov. 7, 2014.
U.S. Appl. No. 13/282,282, filed Oct. 26, 2011, Final Office Action dated Dec. 26, 2014.
U.S. Appl. No. 13/282,315, filed Oct. 26, 2011, Office Action dated Feb. 18, 2015.
U.S. Appl. No. 13/282,297, filed Oct. 26, 2011, Office Action dated Mar. 16, 2015.
U.S. Appl. No. 13/282,282, filed Oct. 26, 2011, Office Action dated May 11, 2015.
U.S. Appl. No. 13/282,315, filed Oct. 26, 2011, Final Office Action dated Jun. 25, 2015.
U.S. Appl. No. 13/282,282, filed Oct. 26, 2011, Office Action dated Nov. 20, 2015.

(56) References Cited

OTHER PUBLICATIONS

U.S. Appl. No. 13/282,282, filed Oct. 26, 2011, Notice of References cited Nov. 30, 2015.
U.S. Appl. No. 13/282,272, filed Oct. 26, 2011, Final Office Action dated Dec. 9, 2015.
U.S. Appl. No. 13/282,297, filed Oct. 26, 2011, Final Office Action dated Dec. 30, 2015.
U.S. Appl. No. 13/282,315, filed Oct. 26, 2011, Office Action dated Mar. 9, 2016.
U.S. Appl. No. 13/282,272, filed Oct. 26, 2011, Office Action dated May 19, 2016.
U.S. Appl. No. 13/282,272, filed Oct. 26, 2011, Final Office Action dated Aug. 23, 2016.
U.S. Appl. No. 13/282,315, filed Oct. 26, 2011, Final Office Action dated Sep. 14, 2016.
U.S. Appl. No. 13/282,297, filed Oct. 26, 2011, Office Action dated Oct. 12, 2016.
U.S. Appl. No. 13/282,282, filed Oct. 26, 2011, Final Office Action dated Nov. 14, 2016.
U.S. Appl. No. 15/299,828, filed Oct. 21, 2016, Office Action dated Aug. 17, 2017.
U.S. Appl. No. 15/299,828, filed Oct. 21, 2016, Notice of Allowance dated Feb. 2, 2018.
U.S. Appl. No. 13/282,297, filed Oct. 26, 2011, Notice of Allowance dated May 31, 2017.
U.S. Appl. No. 14/604,367, filed Jan. 23, 2015, Office Action dated Jun. 16, 2017.
U.S. Appl. No. 14/604,330, filed Jan. 23, 2015, Office Action dated Jun. 30, 2017.
U.S. Appl. No. 14/604,367, filed Jan. 23, 2015, Final Office Action dated Sep. 21, 2017.
U.S. Appl. No. 15/618,399, filed Jun. 9, 2017, Office Action dated Apr. 29, 2019.
U.S. Appl. No. 15/618,399, filed Jun. 9, 2017, Notice of Allowance dated Aug. 26, 2019.
U.S. Appl. No. 14/836,564, filed Aug. 26, 2015, Office Action dated Aug. 9, 2018.
Saleri et al., "Shaybah-220: A Maximum-Reservoir-Contact (MRC) Well and Its Implications for Developing Tight-Facies Reservoirs", SPE Reservoir Evaluation & Engineering, pp. 316-321, Aug. 2004.
Liu et al., "A Real-Time High Performance Computation Architecture for Multiple Moving Target Tracking Based on Wide-Area Motion Imagery via Cloud and Graphic Processing Units", published Feb. 12, 2017 (Year: 2017).
Zhai et al., "Smart Autopilot Drone System for Surface Surveillance and Anomaly Detection via Customizable Deep Neural Network", 2020 (Year: 2020).

\* cited by examiner compression →

Fault Value = 2
Reservoir layer 50% offset by fault

Fault Value = 3
Reservoir layer <20% offset by fault

Fault Value = 1
Reservoir layer 100% offset by fault

Fracture Value = 3

Low fracture density

Fracture Value = 4

Moderate fracture density

Fracture Value = 5

High fracture density

PETROLEUM RESERVOIR OPERATION USING RESERVES RANKING ANALYTICS

CROSS REFERENCE TO RELATED APPLICATIONS

This Application is a continuation of U.S. patent application Ser. No. 15/299,828, filed Oct. 21, 2016, which is a continuation-in-part of U.S. patent application Ser. No. 13/282,272, filed Oct. 26, 2011, now abandoned, the disclosures of which are incorporated herein by reference in their entirety.

BACKGROUND OF THE INVENTION

1. The Field of the Invention

The invention is in the field of petroleum reservoir management, more particularly in improving operation of a petroleum reservoir based on technical, geophysical, and economic analyses and metrics.

2. The Relevant Technology

Petroleum is a critical fuel source and is the life blood of modern society. There is tremendous economic opportunity in finding and extracting petroleum. Due to a variety of technical and geological obstacles, it is typically impossible to recover all of the petroleum contained in a reservoir. With advancing technologies and increasing economic incentive due to higher crude oil prices, the average petroleum reservoir recovery rate can now approach about 35%. While this represents a significant increase in average total petroleum recovery in recent years, it also means that about 65% of the petroleum found in a typical reservoir remains unrecoverable from an economic and/or technical standpoint.

With regard to productivity, petroleum reservoir operators typically analyze each individual well to determine the rate of petroleum extraction, or well productivity. However, operators typically do not understand how to evaluate and understand aggregate well activity and productivity for an entire reservoir or oil field, or how to evaluate well activity and productivity across a plurality of reservoirs or oil fields.

Given the high cost of exploration, dwindling opportunities to find new petroleum reservoirs, and the rising cost of petroleum as a commodity, there currently exists a tremendous economic opportunity for organizations to significantly increase both short-term and long-term production across their petroleum reservoir assets. The fact that a majority of petroleum in a typical reservoir remains unrecoverable in spite of the high marginal economic benefits of increasing recovery means that there do not currently exist technologically and/or economically predictable ways of increasing recovery.

While the technology may, in fact, exist to increase current production and/or increase total long-term recovery of an organization's petroleum reservoirs, an impediment to implementing an intelligent long-term plan for maximizing current output, extending the life of each reservoir, and increasing total recovery across reservoirs is inadequate knowledge of where to focus limited resources for optimal production. For example, a particular reservoir may underperform relative to other reservoirs, which might lead some to neglect further development of the reservoir. However, the reservoir may, in fact, contain much larger quantities of recoverable petroleum compared to other reservoirs but may be under-producing simply due to poor management and understanding of geophysical barriers to production. Furthermore, petroleum producers may waste resources developing reservoirs in which the production gains achieved are disproportionately small compared to the developmental resources expended. The inability to properly diagnose geophysical reality across a plurality of reservoirs and correctly identify which reservoirs to focus further development and resources and to implement an intelligent recovery plan can result in diminished short-term productivity and long-term recovery across the petroleum reservoirs.

In general, those who operate production facilities typically focus on oil well maintenance at an individual reservoir level, and may even implement the latest technologies for maximizing well output at that reservoir. They fail, however, to understand the total picture of health and longevity of the reservoir and how the reservoir performs relative to other reservoirs, both on a short-term and on a long-term basis. Wells are difficult and expensive to drill and operate. Once a given number of wells are in place, it may be economically infeasible to drill more wells in order to increase reservoir production (i.e., the marginal cost may exceed the marginal benefit). Moreover, there may be no apparent reason to shut down a producing well even though doing so might actually increase short-term production and improve long-term recovery. The knowledge of when and why to shut down or alter a producing well and/or properly construct a new well often eludes even the most experienced producers and well managers. The failure to properly manage existing wells and/or place and construct new wells can increase capital costs while reducing production and recovery.

One impediment to maximizing production and recovery of an organization's petroleum reservoirs is the inability to gather, intelligently analyze and correctly understand the relevant geotechnical data about the reservoirs. Diagnosing the health of petroleum reservoirs is not straightforward and is much like trying to decipher the health of a human body, but at a location far beneath the earth or ocean. Moreover, the available data may take years to accumulate and assess and may be dynamically changing, making it difficult to formulate and implement an economically and/or technically feasible plan of action. The result is continuing low short-term productivity and long-term recovery of petroleum from the petroleum reservoirs.

BRIEF SUMMARY OF THE INVENTION

The present invention relates to reservoir management, and more particularly to methods, systems, and computer program products for analyzing geotechnical characteristics and classifying petroleum reservoirs into tiers in a manner that captures and ranks the petroleum reservoirs in terms of opportunities for petroleum exploitation. The concept may be called "reserves ranking analytics" (RRA). RRA is a systematic methodology that broadly classifies petroleum assets into tiers of opportunity using geotechnical and economic metrics and can aid organizations in achieving maximum sustainable hydrocarbon output, reserves appreciation, and capital efficiency. RRA is comprised of a unique presentation or analysis of metrics, indices and measures as they relate to the remaining petroleum in place at each reservoir (i.e., potential prize or remaining resource size), the estimated ultimate recovery potential of each reservoir, and profitability of each reservoir. By providing an empirical classification/ranking of reservoirs, with a focus on capturing top opportunities for petroleum exploitation, RRA can be used to make sense out of complex data and to evaluate the quality of alternative solutions in a standardized internally consistent manner.

An important aspect of RRA is the determination of the recovery potential for each petroleum reservoir and then using the recovery potential to perform one or more adjustments to operation of the petroleum reservoir, including, but not limited to manually or automatically adjusting operation of one or more reservoir production units of the petroleum reservoir selected from producing oil wells, water injection wells, gas injection wells, heat injectors, or sub-components thereof, and wherein adjusting the operation of the one or more reservoir production units is selected from change in volume, change in pressure, change in temperature, change in well bore path, drilling one or more new production units, or shutting down one or more existing production units.

In some embodiments, the recovery potential of a petroleum reservoir is determined using at least three geotechnical metrics including (1) compartmentalization factor, (2) reservoir permeability, and (3) depth factor. The compartmentalization factor relates to relative connectivity or disconnectivity between adjacent regions of a reservoir and can be determined using geophysical measurements and/or data relating to vertical and/or horizontal discontinuity (e.g., existence and level of faulting, existence and level of fractures, and type of rock). The reservoir permeability relates to how easily fluid can flow through rock pores and fissures and can be determined using geophysical measurements and/or data relating to average permeability, average net reservoir thickness, and oil viscosity. The depth factor relates to the depth of the reservoir and can be determined using geophysical measurements and/or data relating to depth in one or more locations, which affects recoverability in terms of matrix porosity, which typically decreases with increasing depth, and over-pressure, drilling complexity, drilling cost, and workover cost, which typically increase with increasing depth.

In some embodiments the compartmentalization factor, reservoir permeability, and depth factor can be used to determine a geotechnical index (GTI for a petroleum reservoir. They can also be used to determine a reservoir development quality index (RDQI) for the petroleum reservoir.

The effectiveness of RRA is based on its unique combination of metrics which emphasize the fundamental areas of reservoir performance while filtering out non-critical parameters which only add noise to the evaluation process. The RRA classification can be used in the allocation of limited reservoir developmental resources, ensuring that an organization's reserves are efficiently exploited, both in the short term and in the long term.

RRA can also form part of a more comprehensive reservoir evaluation system and methodology known as reservoir competency asymmetric assessment (RCAA), which is discussed more fully below in the Detailed Description.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

I. Introduction

Figure 1:
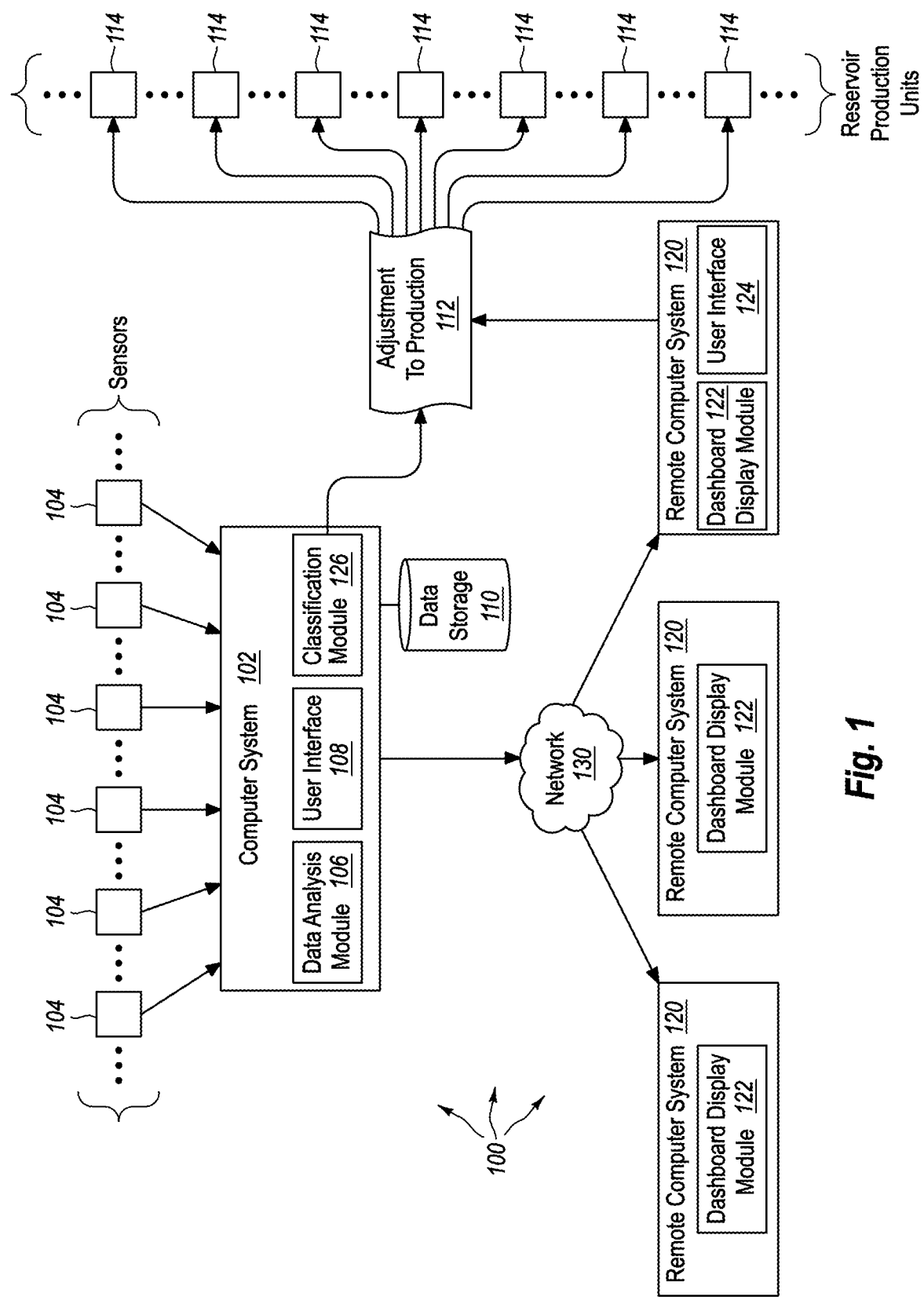
FIG. 1 schematically illustrates exemplary computer-implemented or controlled architecture that can be used to gather, analyze and/or display data gathered from and about petroleum reservoirs.

As discussed above, reserves ranking analytics (RRA) is a systematic methodology that broadly classifies petroleum assets into tiers of opportunity using geotechnical and economic metrics, and can aid organizations in achieving maximum sustainable hydrocarbon output, reserves appreciation, and capital efficiency. It involves a unique presentation or analysis of metrics, indices and measures as they relate to the remaining petroleum in place at each reservoir (i.e., potential prize or remaining resource size), the estimated ultimate recovery potential (EURP) of each reservoir, and profitability of each reservoir.

Implementation of RRA involves an analysis and classification of each reservoir according to the relative risk and impact of future incremental investments, using one or more filtering metrics or indicators. In this way, RRA can classify reservoirs in a manner that can highlight opportunities for petroleum extraction, gaps in current extraction practices, and preferred trends in capital allocations. As discussed in greater detail later, the filtering metrics/indicators can include (i) resource size, characterized by one or more of oil initially in place (OUP), remaining oil in place (OIP), or future oil to be recovered; (ii) recovery potential, characterized by one or more of estimated ultimate recovery (EUR), geotechnical index (GTI), or reservoir development quality index (RDQI); or (iii) profitability, characterized by one or more of internal rate of return (IRR), return of revenues (ROR), or a net present value (NPV).

II. Use of RRA as Part of RCAA

Reserves ranking analytics (RRA) can be used in conjunction with, and as a component of, a larger, more comprehensive system for assessing petroleum reservoir competency. One example of a larger, more comprehensive system developed by the inventors is known as reservoir competency asymmetric assessment (or RCAA), a description of which is set forth in U.S. Pat. No. 7,963,327, issued Jun. 21, 2011, and entitled "METHOD FOR DYNAMICALLY ASSESSING PETROLEUM RESERVOIR COMPETENCY AND INCREASING PRODUCTION AND RECOVERY THROUGH ASYMMETRIC ANALYSIS OF PERFORMANCE METRICS," which is incorporated by reference.

By way of background, RCAA includes several closely interrelated sub-methods or modules that are employed in concert and sequentially. These methods or modules can be used in forming metrics and indicators regarding petroleum reserves that used as part of the RRA, and knowledge gained as part of an RRA can be further applied to an iterative application of the RCAA of petroleum reserves. The methods or modules include (i) analyzing and diagnosing the specific and unique features of a reservoir (i.e., its "DNA") using targeted metrics, of which the recovery deficiency indictor (RDI) is one of the components, (ii) designing a recovery plan for maximizing or increasing current production and ultimate recovery (e.g., increasing recoverable petroleum reserves) from the petroleum reservoir, (iii) implementing the recovery plan so as to increase current production and ultimate recovery of petroleum from the reservoir, and (iv) monitoring or tracking the performance of the petroleum reservoir using targeted metrics and making adjustments to production parameters, as necessary, to maintain desired productivity and recovery.

RCAA and RRA each rely on intense knowledge gathering techniques, which can include taking direct measurements of the physics, geology, and other unique conditions and aspects of the reservoir and, where applicable, considering the type, number, location and efficacy of any wells that are servicing, or otherwise associated with, the reservoir (e.g., producing wells, dead wells, and observation wells), analyzing the present condition or state of the reservoir using asymmetric weighting of different metrics, and prognosticating future production, recovery and other variables based on a comprehensive understanding of the specific reservoir DNA coupled with the asymmetric weighting and analysis of the data. In some cases, the gathered information may relate to measurements and data generated by others (e.g., the reservoir manager).

In general, RCAA is an assessment process which guides both the planning and implementation phases of petroleum recovery. All hydrocarbon assets carry an individual "DNA" reflective of their subsurface and surface features. RCAA is an enabling tool for developing and applying extraction methods which are optimally designed to the specifications of individual hydrocarbon reservoirs. Its main value is assisting in the realization of incremental barrels of reserves and production over and above levels being achieved using standard industry techniques. This, in turn, may reduce long-term capital and operating expenses.

According to one embodiment, implementation of RCAA spans six interweaving and interdependent tracks: i) knowledge systems; ii) Q6 surveys; iii) deep insight workshops; iv) Q-diagnostics; v) gap analysis; and vi) plan of action. The information gathered from these tracks is integrated using modern knowledge-sharing mediums including web-based systems and communities of practice. While the overall business model of RCAA includes both technological and non-technological means for gathering the relevant information, the method cannot be implemented without the use of physical processes and machinery for gathering key information. Moreover, implementing a plan of action involves computerized monitoring of well activity. And enhanced reservoir performance results in a physical transformation of the reservoir itself.

Performing a reserves ranking analytics (RRA) classification similarly involves physical processes and machinery for gathering key information. Converting such information, which relates to both the geological characteristics of the reservoir as well as operational attributes of the petroleum recovery plan, into a reserves ranking analytics (RRA) classification is a transformation of essentially physical data into a diagnostic determination or score of petroleum reservoirs. To the extent that such transformations of data are carried out using a computer system programmed to perform a reserves ranking analytics (RRA) classification from the underlying data, more particularly using a processor and system memory, such a computer system is itself a machine and such programming enhances performance of the computer (i.e., special purpose computer).

Because the subsurface plumbing of the reservoir is not homogeneous, it will often be necessary to statistically weight some data points more than others in order to come up with a more accurate assessment of the reservoir. In some cases, outlier data points may simply be anomalies and can be ignored or minimized. In other cases, outliers that show increased recovery efficiency for one or more specific regions of the reservoir may themselves be the ideal and indicate that extraction techniques used in other, less productive regions of the reservoir need improvement.

Physical processes that utilize machinery to gather data include, for example, (1) coring to obtain down hole rock samples (both conventional and special coring), (2) taking down hole fluid samples of oil, water and gas, (3) measuring initial pressures from radio frequency telemetry or like devices, and (4) determining fluid saturations from well logs (both cased hole and open hole). Moreover, once a plan of action is implemented and production and/or recovery from the reservoir are increased, the petroleum reservoir is transformed from a lower-producing to a higher-producing physical operation.

Monitoring the performance of the reservoir before, during and/or after implementation of a plan of action involves the use of a computerized system (i.e., part of a "control room") that receives, analyzes and displays relevant data (e.g., to and/or between one or more computers networked together and/or interconnected by the internet). Examples of metrics that can be monitored include (1) reservoir pressure and fluid saturations and changes with logging devices, (2) well productivity and drawdown with logging devices, (3) fluid profile in production and injection wells with logging devices, and (4) oil, gas and water production and injection rates. Relevant metrics can be transmitted and displayed to recipients using the internet or other network. Web based systems can share and display such data in physical form.

FIG. 1 illustrates an exemplary computer-implemented monitoring and analysis system 100 that monitors reservoir performance, analyzes information regarding reservoir performance, displays dashboard metrics, and optionally provides for computer-controlled modifications to maintain optimal oil well performance. Monitoring and analysis system 100 includes a main data gathering computer system 102 comprised of one or more computers located near a reservoir and linked to reservoir sensors 104. Each computer typically includes at least one processor and system memory. Computer system 102 may comprise a plurality of networked computers (e.g., each of which is designed to analyze a sub-set of the overall data generated by and received from the sensors 104). Reservoir sensors 104 are typically positioned at producing oil well, and may include both surface and sub-surface sensors. Sensors 104 may also be positioned at water injection wells, observation wells, etc. The data gathered by the sensors 104 can be used to generate performance metrics (e.g., leading and lagging indicators of production and recovery), including those which relate to reserves ranking analytics (RRA). The computer system 102 may therefore include a data analysis module 106 programmed to establish reservoir metrics from the received sensor data. A user interface 108 provides interactivity with a user, including the ability to input data relating to areal displacement efficiency, vertical displacement efficiency, and pore displacement efficiency. Data storage device or system 110 can be used for long term storage of data and metrics generated from the data, including data and metrics relating to reserves ranking analytics (RRA). A classification module 126 uses reservoir metrics established by the data analysis module 106 to classify reservoirs into one or more of classifications or tiers.

According to some embodiments, the computer system 102 can provide for or facilitate at least one of manual or automatic adjustment to production 112 by reservoir production units 114 (e.g., producing oil wells, water injection wells, gas injection wells, heat injectors, and the like, and sub-components thereof). Adjustments might include, for example changes in volume, pressure, temperature, well bore path (e.g., via closing or opening of well bore branches). The user interface 108 permits manual adjustments to production 112. The computer system 102 may, in addition, include alarm levels or triggers that, when certain conditions are met, provide for automatic adjustments to production 112.

Monitoring system 100 may also include one or more remote computers 120 that permit a user, team of users, or multiple parties to access information generated by main computer system 102. For example, each remote computer 120 may include a physical dashboard display module 122 that renders and displays dashboards, metrics, or other information relating to reservoir production. Each remote computer 120 may also include a physical user interface 124 that permits a user to control and/or make adjustment to production 112 by reservoir production units 114. Each remote computer 120 may also include a data storage device (not shown).

Individual computer systems within monitoring and analysis system 100 (e.g., main computer system 102 and remote computers 120) can be connected to a network 130, such as, for example, a local area network ("LAN"), a wide area network ("WAN"), or even the Internet. The various components can receive and send data to each other, as well as other components connected to the network. Networked computer systems and computers themselves constitute a "computer system" for purposes of this disclosure.

Networks facilitating communication between computer systems and other electronic devices can utilize any of a wide range of (potentially interoperating) protocols including, but not limited to, the IEEE 802 suite of wireless protocols, Radio Frequency Identification ("RFID") protocols, ultrasound protocols, infrared protocols, cellular protocols, one-way and two-way wireless paging protocols, Global Positioning System ("GPS") protocols, wired and wireless broadband protocols, ultra-wideband "mesh" protocols, etc. Accordingly, computer systems and other devices can create message related data and exchange message related data (e.g., Internet Protocol ("IP") datagrams and other higher layer protocols that utilize IP datagrams, such as, Transmission Control Protocol ("TCP"), Remote Desktop Protocol ("RDP"), Hypertext Transfer Protocol ("HTTP"), Simple Mail Transfer Protocol ("SMTP"), Simple Object Access Protocol ("SOAP"), etc.) over the network.

Computer systems and electronic devices may be configured to utilize protocols that are appropriate based on corresponding computer system and electronic device on functionality. Components within the architecture can be configured to convert between various protocols to facilitate compatible communication. Computer systems and electronic devices may be configured with multiple protocols and use different protocols to implement different functionality. For example, a sensor 104 at an oil well might transmit data via wire connection, infrared or other wireless protocol to a receiver (not shown) interfaced with a computer, which can then forward the data via fast Ethernet to main computer system 102 for processing. Similarly, the reservoir production units 114 can be connected to main computer system 102 and/or remote computers 120 by wire connection or wireless protocol.

Embodiments within the scope of the present invention also include physical and other computer-readable media for carrying or storing computer-executable instructions and/or data structures. Such computer-readable media can be any available tangible storage media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code.

III. RRA Metrics and Indicators

As indicated, an RRA classification can involve the use of one or more metrics and/or indicators. The metrics/indicators serve as filters that broadly classify petroleum assets into different categories or tiers of opportunity. The classifications can, in turn, highlight top opportunities for petroleum extraction, gaps in current extraction practices, preferred trends in capital allocations, etc. The metrics or indicators fall into three primary filtering categories: resource size, recovery potential, and profitability.

A. Resource Size

A first metric or indicator is the "potential prize" or the size of the opportunity for exploitation of a petroleum reservoir. The resource size can be characterized by one or more of an estimate of the "oil initially in place" (OIIP) (i.e., the volume of oil present in the reservoir at the time of discovery), an estimate of the remaining "oil in place" (OIP or ROIP), or an estimate of future oil to be recovered. Generally, the OIP encapsulates an unbiased estimate of exploitation opportunities, as it can capture both the current state of reservoir depletion and the maximum upside reserves potential. OIIP may not capture current conditions that a reservoir is in or has gone through, and an estimate of future oil to be recovered is inherently built on assumptions about future exploitation processes.

B. Recovery Potential

A second metric or indicator is the estimated ultimate recovery potential (EURP) for a reservoir. In some embodiments, the recovery potential of a petroleum reservoir is determined using at least three geotechnical metrics including (1) compartmentalization factor, (2) reservoir permeability, and (3) depth factor. The recovery potential can also be characterized using one or more of a geotechnical index (GTI) metric or a reservoir development quality index (RDQI) metric.

1. Geo-Technical Index (GTI)

The GTI metric captures the primary geologic complexities that drive recovery efficiency. It was used as a recovery potential indicator. Inputs include transmissibility, compartmentalization, and depth. Although each reservoir has a unique set of challenges and complexities, the GTI has a demonstrated ability to capture key recovery drivers within each reservoir, for both clastic (e.g., shale or sand) and carbonate (e.g., limestone or dolomite) rock types. The GTI is designed as a screening tool and is ideal for use with operations containing large numbers of reservoirs and operating units. The GTI is a linear combination that, according to some implementations, can vary from 0 to 100 and can be defined or determined as follows:

$$GTI = n_a * A + n_b * B + n_c * C$$

where:
A=compartmentalization factor;
B=transmissibility index;
C=depth factor;
$n_a$=weighting coefficient for compartmentalization factor;
$n_b$=weighting coefficient for transmissibility index; and
$n_c$=weighting coefficient for depth factor;

The GTI can be determined using different sensitivities, such as use of different weighting coefficients, which can weight each component (compartmentalization factor, transmissibility index, and depth factor) differently. The different GTI sensitivities can then be compared to known benchmarks. For example, exemplary sensitivities given by way of example include:

$GTI_A$—equal weighting ($n_a = n_b = n_c$)
$GTI_B$—2× transmissibility weighting ($n_b$), 2× depth weighting ($n_c$)
$GTI_C$—3× transmissibility weighting ($n_b$)

Figure 2:
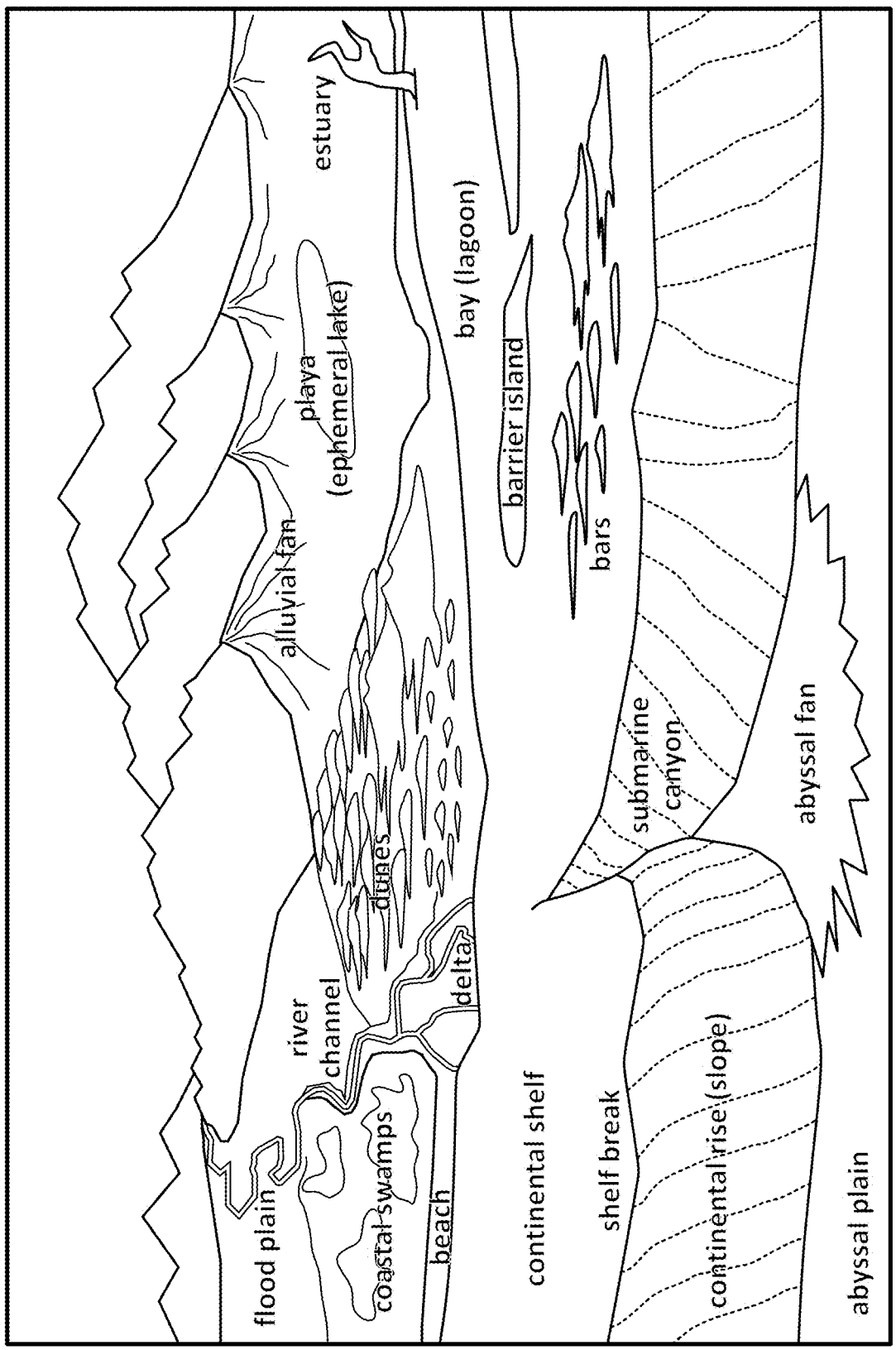
FIG. 2 schematically illustrates various geological features typically encountered when exploring for and recovering petroleum and which affect production and recovery in different ways.

The compartmentalization factor relates to the relative degree of connectivity or disconnectivity between adjacent regions of a petroleum reservoir and can be determined using geophysical measurements and/or data relating to vertical and/or horizontal discontinuity (e.g., existence and level of faulting, existence and level of fractures, and type of rock). The transmissibility index relates to how easily fluid can flow through rock pores and fissures and can be determined using geophysical measurements and/or data relating to average permeability, average net reservoir thickness, and oil viscosity. The depth factor relates to the depth of the reservoir and can be determined using geophysical measurements and/or data relating to depth in one or more locations, which affects recoverability in terms of matrix porosity, which typically decreases with increasing depth, and overpressure, drilling complexity, drilling cost, and workover cost, which typically increase with increasing depth. FIG. 2 illustrates a variety of known geological features that can affect the ability to recover petroleum, including one or more of compartmentalization, transmissibility and depth.

In some embodiments, the compartmentalization factor A for one or more reservoirs can be determined by relating fault value(s), fracture value(s), and rock type (clastic vs. carbonate). Fault value relates to horizontal connectivity. Fracture value relates to vertical connectivity.

Figure 3B:
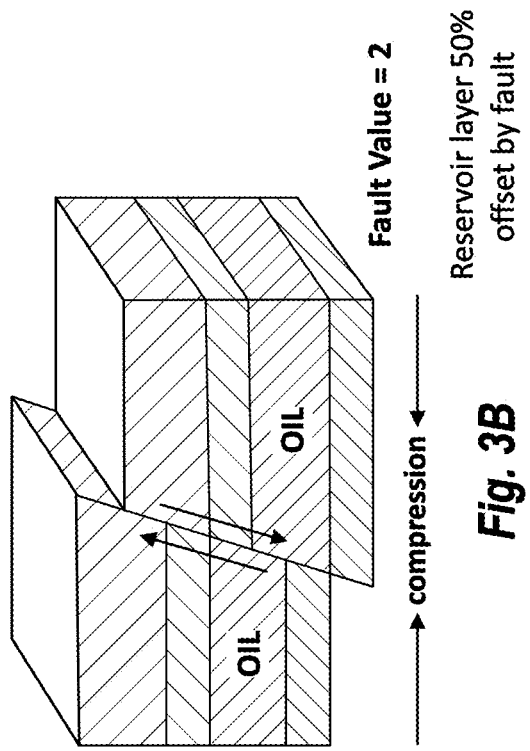
FIGS. 3A-3C schematically illustrate how faults can affect connectivity and compartmentalization of adjacent regions of a petroleum reservoir.
Figure 3C:
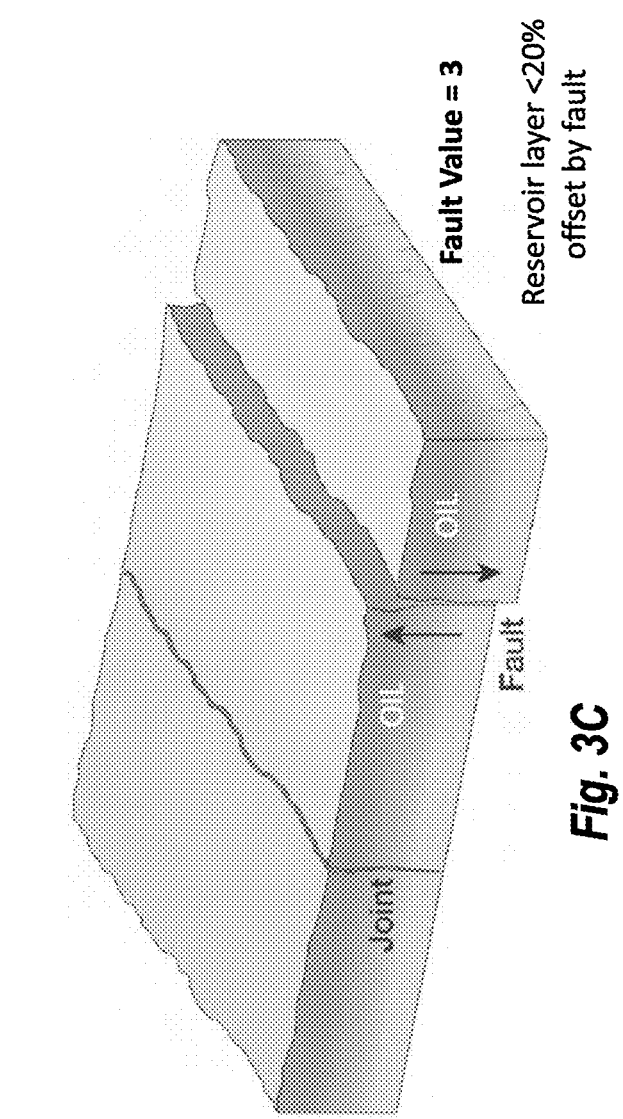
Figure 3A:
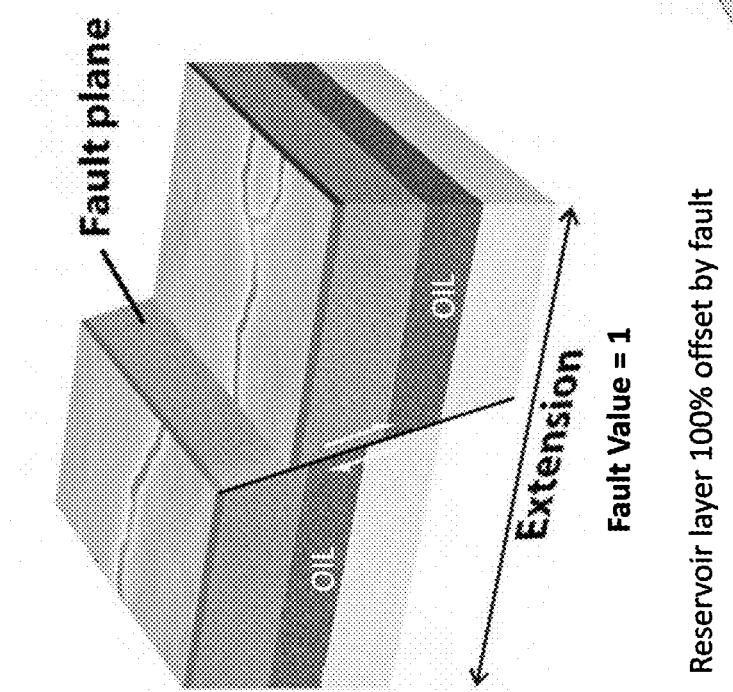

The fault value can be determined by comparing channel or reservoir thickness with fault throw (or amount of fault displacement of adjacent layered formation) and fault density. FIGS. 3A-3C illustrate and compare how fault displacement and reservoir thickness can affect compartmentalization.

FIG. 3A illustrates a reservoir section in which a fault has so much vertical throw that adjacent reservoir layers where oil is contained are offset by 100%. This reservoir has high compartmentalization and therefore receives the lowest fault value of 1 (based on a hypothetical scale of 1-3, with a fault value of 1 corresponding to high compartmentalization and a fault value of 3 corresponding to low compartmentalization).

FIG. 3B illustrates a reservoir section in which a fault has vertically displaced adjacent reservoir layers by 50%. This reservoir has medium compartmentalization and therefore receives a middle fault value of 2.

FIG. 3C illustrates a reservoir section in which a fault has displaced adjacent reservoir layers only by 20%. This reservoir has low compartmentalization (good connectivity) and therefore receives a high fault value of 3.

Table 1 illustrates a determination and comparison of fault values for different reservoirs in the same field. In this instance, the average fault throw and fault density remains constant and channel/reservoir thickness determines the fault value. This can be understood by comparing the distance of fault plane displacement compared to reservoir thickness as illustrated in FIGS. 3A-3C. Any fault plane displacement of any magnitude will create higher reservoir layer offset the greater the ratio of fault plane displacement to reservoir thickness. For this reason, Reservoirs A and D had the highest Fault Values, and Reservoirs B, C, E, G and H had the lowest.

TABLE 1

| Reservoir | Channel/Reservoir Thickness (m) | Fault Throw (m) | Fault Density number/km² | Fault Value |
|---|---|---|---|---|
| A | 180 | <50 | 0.43 | 3 |
| B | 25 | <50 | 0.43 | 1 |
| C | 30 | <50 | 0.43 | 1 |
| D | 200 | <50 | 0.43 | 3 |
| E | 5-15 | <50 | 0.43 | 1 |
| F | 25-50 | <50 | 0.43 | 2 |
| G | 5-15 | <50 | 0.43 | 1 |
| H | 5-10 | <50 | 0.43 | 1 |

Figure 4A:
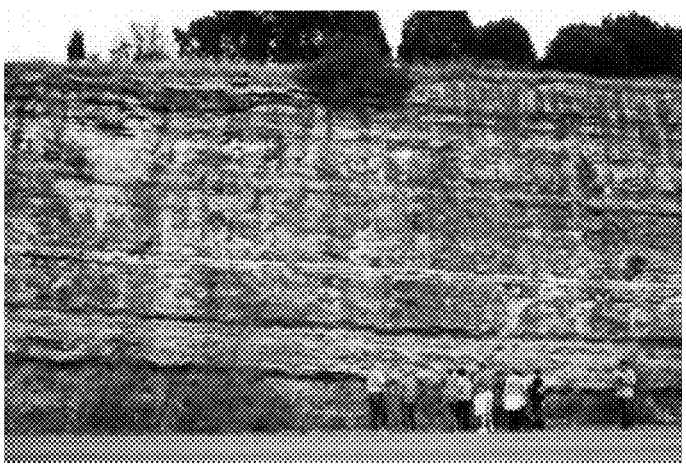
FIGS. 4A-4C illustrate rock formations with different levels of fracturing.
Figure 4B:
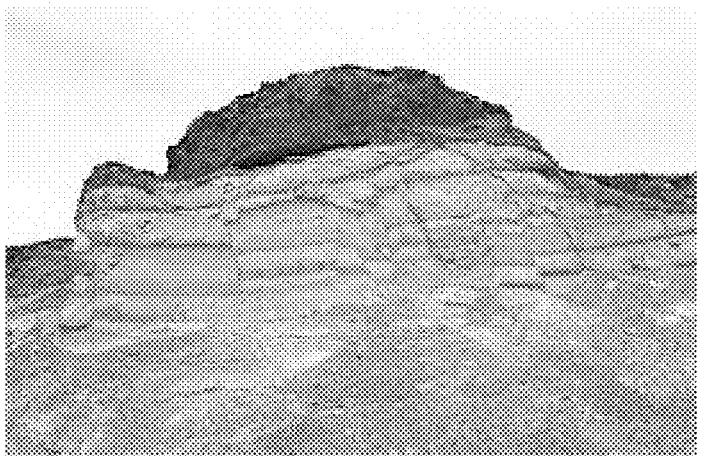
Figure 4C:
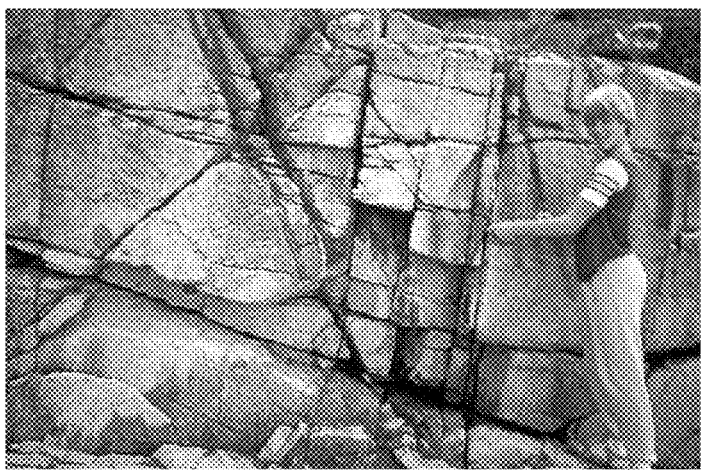

The fracture value can be determined from the fracture density within the reservoir. FIGS. 4A-4C illustrate different rock formations with different fracture densities. FIG. 4A illustrates a layered rock formation with low fracture density; FIG. 4B illustrates a rock formation with moderate fracture density; and FIG. 4C illustrates a layered rock formation with high fracture density.

On a scale of 3-5, low fracture density corresponds to a fracture value of 3; medium fracture density corresponds to a fracture value of 4; and high fracture density corresponds to a fracture value of 5. A higher fracture value correlates with higher vertical connectivity. Table 2 illustrates a determination and comparison of fracture values Reservoirs A-H.

TABLE 2

| Reservoir | Fracture Density | Fracture Value |
|---|---|---|
| A | Low | 3 |
| B | Low | 3 |
| C | Low | 3 |
| D | Low | 3 |
| E | Low | 3 |
| F | Low | 3 |
| G | Low | 3 |
| H | Low | 3 |

A combined fault and fracture value (F&F Value) can be determined by taking a weighted average of the fault and fracture values. When the fracture value is low (i.e., 3), the F&F value is determined by the fault value, as illustrated in Table 3.

TABLE 3

| Reservoir | Fault Value | Fracture Value | F&F Value |
|---|---|---|---|
| A | 3 | 3 | 3 |
| B | 1 | 3 | 1 |
| C | 1 | 3 | 1 |
| D | 3 | 3 | 3 |
| E | 1 | 3 | 1 |
| F | 2 | 3 | 2 |
| G | 1 | 3 | 1 |
| H | 1 | 3 | 1 |

The "net-to-gross" is the ratio of net reservoir thickness to the total (i.e. gross) reservoir thickness and is a measure of lateral reservoir continuity. For example, the net-to-gross of the reservoir in FIG. 3A is 0% the net-to-gross of the reservoir in FIG. 3B is 50%; and the net-to-gross of the reservoir in FIG. 3C is 80%.

The type of rock in a reservoir, clastic or carbonate, determines how the net-to-gross affects the compartmentalization factor. The general assumption is that high net-to-gross values corresponding to higher lateral continuity. Carbonate reservoirs are different from clastic reservoirs. For low net reservoir-to-gross values, carbonates tend to have better lateral continuity than clastic reservoirs. Carbonates have better vertical and horizontal continuity from increases in faulting and fracture density (F&F), as illustrated by Tables 4 and 5.

TABLE 4

| F&F | Compartmentalization A for CARBONATES | | | | | | | | | | |
|---|---|---|---|---|---|---|---|---|---|---|---|
| 5 | 8 | 8.2 | 8.4 | 8.6 | 8.8 | 9 | 9.2 | 9.4 | 9.6 | 9.8 | 10 |
| 4 | 6.5 | 6.8 | 7.1 | 7.4 | 7.7 | 8 | 8.3 | 8.6 | 8.9 | 9.2 | 9.5 |
| 3 | 5 | 5.4 | 5.8 | 6.2 | 6.6 | 7 | 7.4 | 7.8 | 8.2 | 8.6 | 9 |
| 2 | 3.5 | 4 | 4.5 | 5 | 5.5 | 6 | 6.5 | 7 | 7.5 | 8 | 8.5 |
| 1 | 2 | 2.6 | 3.2 | 3.8 | 4.4 | 5 | 5.6 | 6.2 | 6.8 | 7.4 | 8 |
|  | 0% | 10% | 20% | 30% | 40% | 50% | 60% | 70% | 80% | 90% | 100% |
|  | NET-TO-GROSS | | | | | | | | | | |

TABLE 5

| F&F | Compartmentalization A for CLASTICS | | | | | | | | | | |
|---|---|---|---|---|---|---|---|---|---|---|---|
| 5 | 1 | 2 | 3 | 4 | 5 | 6 | 7 | 8 | 9 | 10 | 10 |
| 4 | 0.75 | 1.75 | 2.75 | 3.75 | 4.75 | 5.75 | 6.75 | 7.75 | 8.75 | 9.75 | 9.75 |
| 3 | 0.5 | 1.5 | 2.5 | 3.5 | 4.5 | 5.5 | 6.5 | 7.5 | 8.5 | 9.5 | 9.5 |

TABLE 5-continued

| F&F | Compartmentalization A for CLASTICS | | | | | | | | | |
|---|---|---|---|---|---|---|---|---|---|---|
| 2 | 0.25 | 1.25 | 2.25 | 3.25 | 4.25 | 5.25 | 6.25 | 7.25 | 8.25 | 9.25 | 9.25 |
| 1 | 0 | 1 | 2 | 3 | 4 | 5 | 6 | 7 | 8 | 9 | 9 |
|  | 0% | 10% | 20% | 30% | 40% | 50% | 60% | 70% | 80% | 90% | 100% |
|  |  |  |  |  | NET-TO-GROSS |  |  |  |  |  |  |

By way of example, a final "compartmentalization factor" can be determined using an appropriate matrix, such as what is illustrated in Table 6, which relates the net-to-gross and F&F using an appropriate Net-to-Gross table which, in this case, is Table 5 because Reservoirs A-H have both clastic and carbonate rocks.

TABLE 6

| | | Compartmentalization Factor | | |
|---|---|---|---|---|
| Reservoir | Lithology | Net-to-Gross | F&F | A |
| A | Carbonate | 86% | 3 | 8.2 |
| B | Clastic | 44% | 1 | 4 |
| C | Clastic | 45% | 1 | 4 |
| D | Clastic | 92% | 3 | 9.5 |
| E | Clastic | 32% | 1 | 3 |
| F | Clastic | 63% | 2 | 6.25 |
| G | Clastic | 56% | 1 | 5 |
| H | Clastic | 35% | 1 | 3 |

The transmissibility index B can be determined from permeability, reservoir thickness, and oil viscosity. In some embodiments, the transmissibility index B can be defined or determined as follows:

$$B = \log(k^* h_{net}/\mu)$$

where:
k=average permeability (from well tests if significantly fractured);
$h_{net}$=average net reservoir thickness (e.g., in feet);
µ=oil viscosity (e.g., in centipoise, cp).

For Reservoirs A-H the determined transmissibility indices determined from the measured values according to the above relationship are set forth in Table 7.

TABLE 7

| | Transmissibility Index | | | |
|---|---|---|---|---|
| Reservoir | k(md) | $h_{net}$ | µ(cp) | B |
| A | 76 | 170 | 0.90 | 4.2 |
| B | 200 | 67 | 1.35 | 4.0 |
| C | 800 | 74 | 0.49 | 5.1 |
| D | 2200 | 230 | 0.49 | 6.0 |
| E | 200 | 92 | 0.57 | 4.5 |
| F | 1000 | 329 | 0.53 | 5.8 |
| G | 200 | 157 | 0.31 | 5.0 |
| H | 100 | 61 | 0.35 | 4.2 |

The depth factor C typically varies between 1000-6000 meters and can be determined according to the following:

$$C = ((6000 - \text{Depth})/5000 * 10$$

If the reservoir is shallower than 1000 meters, the depth factor defaults to the highest value of C=10. If deeper than 6000 meters, the depth factor defaults to the lowest value of C=1. The assumptions and issues concerning increasing depth include: matrix porosity decreases, over-pressure is more likely, drilling complexity increases, drilling costs increase, and workover costs increase. The depth factors for Reservoirs A-H are set forth in Table 8.

TABLE 8

| | Depth Factor C | |
|---|---|---|
| Reservoir | Depth (m) | C |
| A | 2189 | 7.62 |
| B | 2302 | 7.40 |
| C | 2399 | 7.20 |
| D | 2454 | 7.09 |
| E | 2668 | 6.66 |
| F | 2698 | 6.60 |
| G | 2774 | 6.45 |
| H | 2896 | 6.21 |

Table 9 shows the determination of geotechnical indices for each of Reservoirs A-H using the compartmentalization factor, transmissibility index, and depth factor determined for each reservoir, with appropriate weighting factors

TABLE 9

| | Geotechnical Index - Oil Field | | | | | | |
|---|---|---|---|---|---|---|---|
| Reservoir | $n_A$ | A | $n_B$ | B | $n_C$ | C | GTI |
| A | 2 | 8.2 | 6 | 4.2 | 2 | 7.62 | 56.6 |
| B | 2 | 4 | 6 | 4.0 | 2 | 7.20 | 46.8 |
| C | 2 | 4 | 6 | 5.1 | 2 | 7.09 | 52.9 |
| D | 2 | 9.5 | 6 | 6.0 | 2 | 6.66 | 69.3 |
| E | 2 | 3 | 6 | 4.5 | 2 | 6.60 | 46.4 |
| F | 2 | 6.25 | 6 | 5.8 | 2 | 6.45 | 60.5 |
| G | 2 | 5 | 6 | 5.0 | 2 | 6.21 | 52.9 |
| H | 2 | 3 | 6 | 4.2 | 2 | 7.20 | 43.6 |

As shown below, the three components of GTI (compartmentalization factor, transmissibility index, and depth factor) correlate with the estimated ultimate recovery factor (EURF). Petroleum reservoirs that are highly compartmentalized (or discontinuous), either vertically or laterally, typically exhibit lower recovery efficiency. The transmissibility accounts for reservoir thickness, permeability, and fluid viscosity, with high transmissibility correlating with higher recovery efficiency. Shallow reservoirs (lower depth factor) also generally exhibit higher recovery efficiency than deeper reservoirs because of the time and cost required to drill (hence the ultimate spacing that can be attained), and the time and cost required to monitor and intervene in the reservoir.

Figure 5:
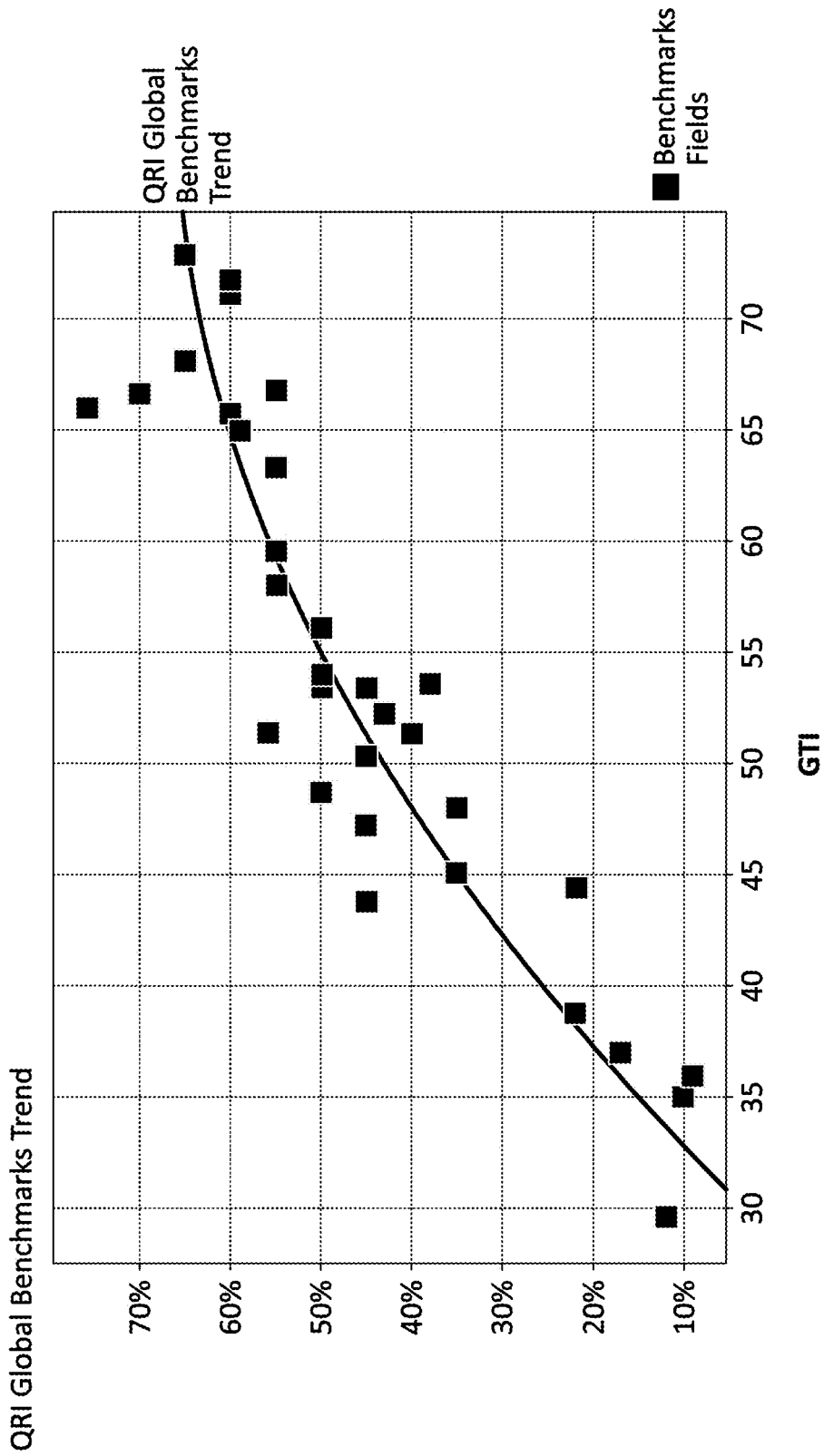
FIG. 5 is a graph plotting and illustrating an observed relationship between geotechnical index (GTI) and estimated ultimate recovery factor (EDRF) for different reservoirs that have been analyzed.

FIG. 5 illustrates the correlation between geotechnical index (GTI) and estimated ultimate recovery factor (EURF). Global benchmark trend (GBT) is a best fit curve through GTI values determined from reservoirs with "best practices" reservoir management applied according to Quantum Reservoir Impact (QRI). "Best practices" implies at least pressure maintenance and secondary recovery. EOR reservoirs are not included. FIG. 5 demonstrates how determining the GTI for each reservoir helps estimate the ultimate recovery of petroleum from the reservoir and assists in determining if and how to take action to improve production of petroleum from the reservoir.

Figure 6:
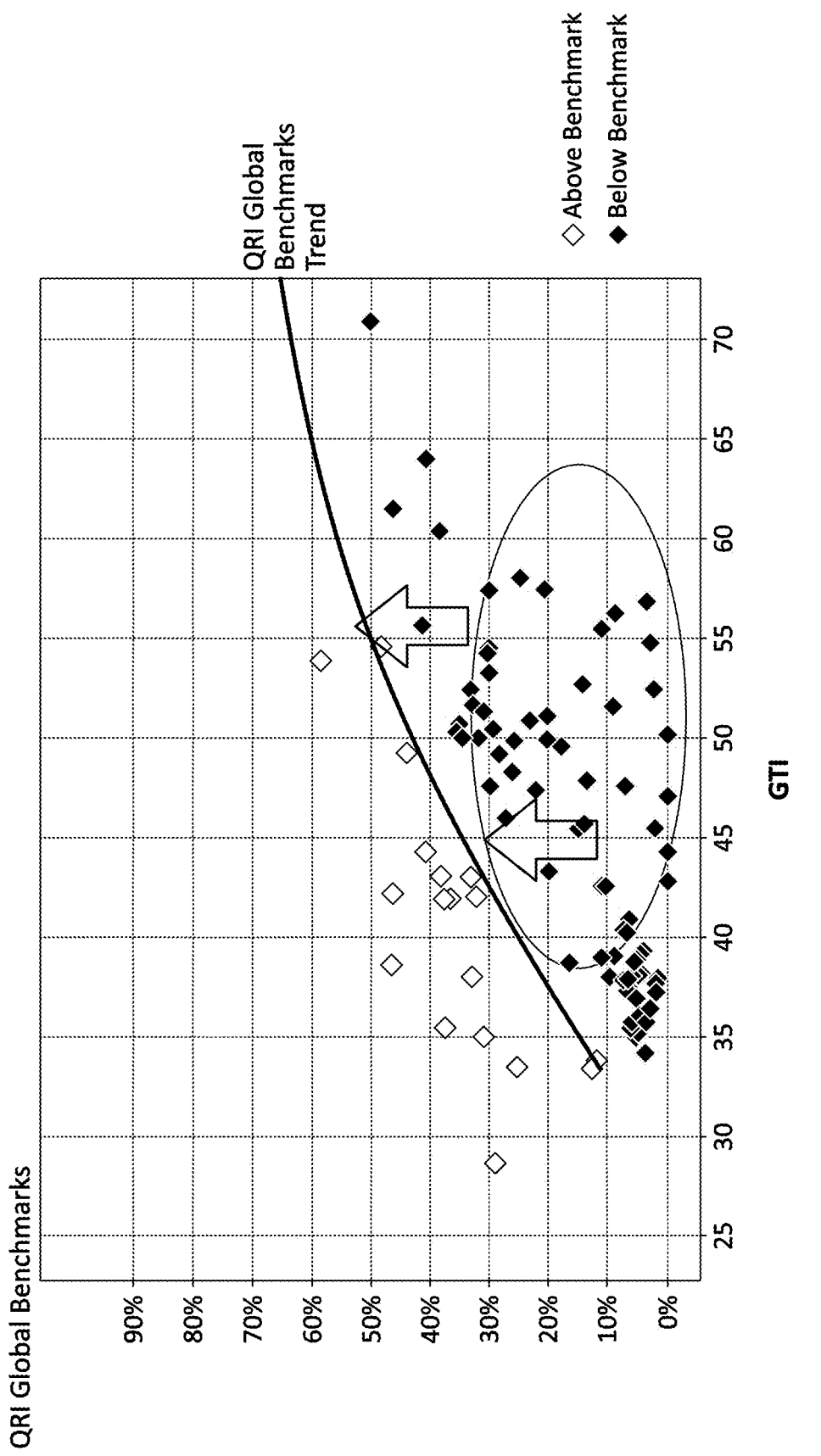
FIG. 6 is a graph plotting and comparing an observed global benchmark trend and petroleum reservoirs that are below or above the benchmark.

FIG. 6 shows the estimated EURF for the largest fields of unnamed Oil Producer against GTI, together with the trend line for QRI worldwide benchmark fields. As can be seen, Oil Producer has many fields that fall below the trend line. The worldwide benchmark fields presented in FIG. 6 have effectively applied advanced technologies and best practices in reservoir management. Adoption of similar strategies at Oil Producer fields might yield higher recoveries, and offers a tremendous potential opportunity for improving and sustaining long-term production.

2. Reservoir Development Quality Index (RDQI)

The reservoir development quality index (RDQI) metric captures the primary field and reservoir parameters which drive recovery efficiency. Inputs include the GTI, crude quality, reserves, well and field performance data, and well drilling costs. It has the ability to identify opportunities for increased investment. The RDQI is a linear combination that typically varies from 0 to 100. The RDQI can be defined or determined as follows:

$$RDQI^{TM} = n_a*A + n_b*B + n_c*C + n_d*D + n_e*E$$

where:
A=the GTI
B=crude quality
C=reserves
D=well productivity index
E=drilling costs
$n_n$=weighting coefficients The five components of RDQI (GTI, crude quality, reserves, well productivity index, and drilling costs) can drive field development decisions and, as a result, their combination correlates with the EDRF. The term "crude quality" generally describes physical and chemical aspects of the crude oil in the reservoir, including but limited to viscosity, boiling point of components, asphaltene content, sulfur content, metal content, and the like. The term "reserves" relates to estimated recoverable hydrocarbons. The term "well productivity index" is a numeric valve relating to well productivity. The term "drilling costs" is self-explanatory.

Numerous sensitivities on RDQI can be calculated based on use of different weighting coefficients, which can weight each component (GTI, crude quality, reserves, well productivity index, and drilling costs) differently. Different sensitivities of RDQI can be appropriate for different situations, questions, and comparisons. For example, some exemplary sensitivities may include:

$RDQI_A$—equal weighting ($n_a = n_b = n_c = n_d = n_e$)
$RDQI_B$—2 times (2×) reserves weighting ($n_c$), 2× well productivity weighting ($n_d$)
$RDQI_C$—3× reserves weighting ($n_c$)
$RDQI_I$—intensive ($n_c = 0$)

Some embodiments include a sensitivity, referred to as $RDQI_I$, that neglects only intensive field properties by omitting reserves. The $RDQI_I$ is useful in analyzing fields when comparisons are made independent of size. The $RDQI_I$ can, in some embodiments, apply a triple weighting on GTI.

Figure 7:
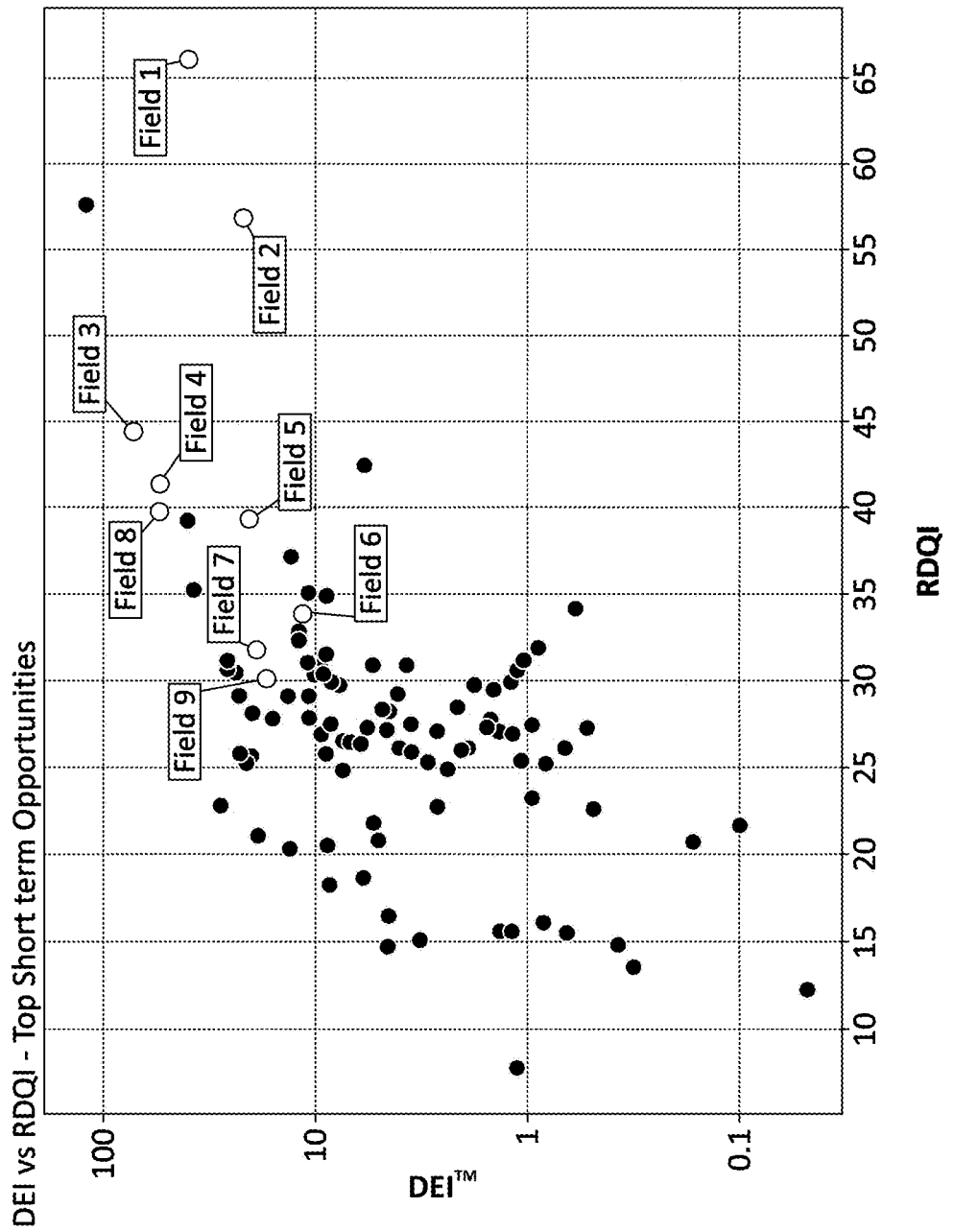
FIG. 7 is a graph that illustrates how top short term opportunities can be identified by plotting and comparing drilling efficiency index (DEI) with reservoir development quality index (RDQI) for various oil fields that have been analyzed.
Figure 8:
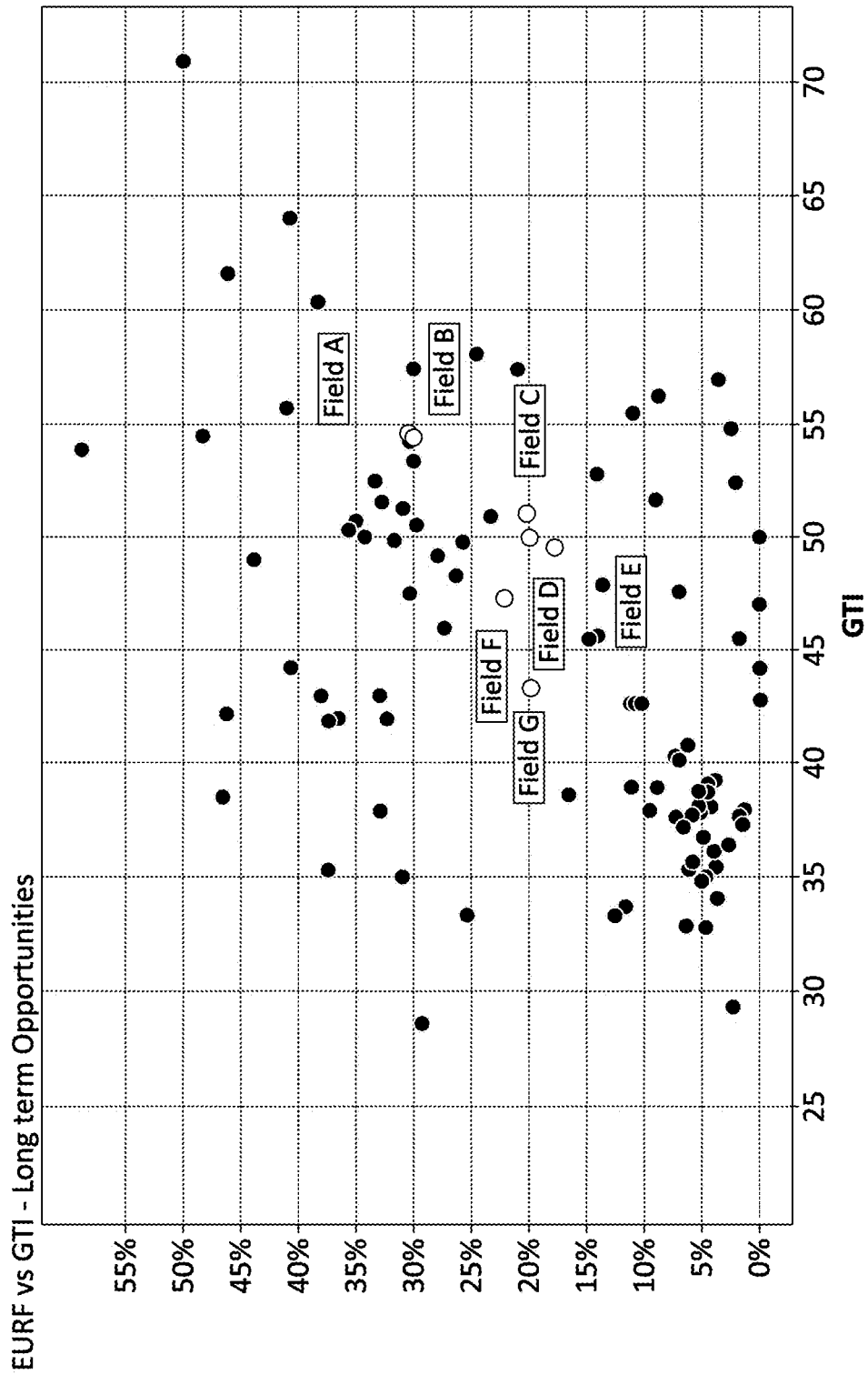
FIG. 8 is a graph that illustrates how long term opportunities can be identified by plotting and comparing estimated ultimate recovery factor (EDRF) with geotechnical index (GTI) for various oil fields that have been analyzed.

FIGS. 7 and 8 illustrates the difference in identifying short term and long term opportunities for improved production and ultimate recovery of oil from a producer's oil fields. FIG. 7 is a graph that illustrates how top short term opportunities can be identified by plotting and comparing drilling efficiency index (DEI) with reservoir development quality index (RDQI) for various oil fields that have been analyzed.

In the short term, production rates can best be increased through accelerated drilling in high impact fields. To identify those fields where production will respond fastest to further drilling, QRI utilized a plot of DEI versus RDQI as shown in FIG. 7. Oil fields with high DEI and high RDQI represent fast response with a high potential for recovery. The upper right quadrant of this plot is therefore where short-term opportunities can be identified.

In the long term, maximizing recovery from each producing field represents the most important means of increasing production. Higher recoveries can be achieved through implementation of advanced technologies and best practices in reservoir management. To identify fields that have the highest recovery potential, QRI utilized a plot of EURF versus GTI shown in FIG. 8. Fields with low EURF and high GTI represent high potential for recovery. The lower right quadrant of this plot is therefore where long-term opportunities can be identified.

C. Profitability

A third metric or indicator is the estimated profitability of a reservoir. It can be characterized using one or more of an internal rate of return (IRR) value for drilled wells, a return of revenues (ROR), or net present value (NPV). For example, the IRR, which is an indicator used throughout the petroleum industry, provides an easily understood means of comparison as between different wells and/or reservoirs. The IRR can represent the rate of growth a field is expected to generate. While the actual rate of return that a given project ends up generating may differ from the estimated IRR rate, a project with a higher IRR value would still likely provide a chance of strong growth. Inasmuch as there may be uncertainties in the computation of IRR for individual wells, normalized values (e.g., a $IRR_n$ that is normalized according to the maximum and minimum values within the data set) can be used instead of IRR when performing an RRA classification.

IV. Implementation of RRA

Figure 9:
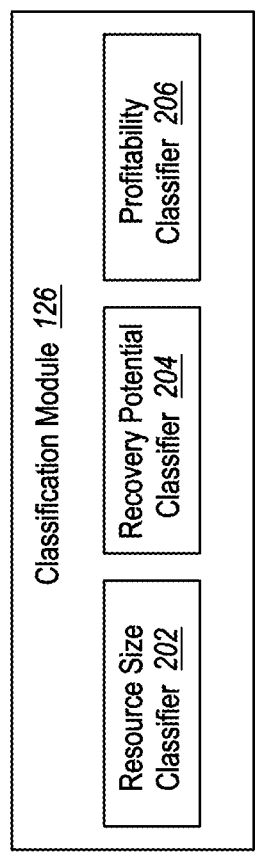
FIG. 9 schematically illustrates an exemplary classification component that can be used to classify petroleum reservoirs.

Referring to FIG. 9, illustrated is an embodiment of the classification module 126 introduced in FIG. 1 as part of the computer system 102. As mentioned, the classification module 126 is configured to use metrics established by the data analysis module 106 to classify reservoirs into one or more of classes (aka classifications) or tiers. The classification module 126 can include a resource size classifier 202, a recovery potential classifier 204, and a profitability classifier 206. Each of the classifiers (202, 204, and 206) can be configured to work independently of the other classifiers, or can be configured to work in concert with one another.

The resource size classifier 202 is configured to classify reservoirs based on one or more metrics or indicators indicating the size of the opportunity the reservoir represents. For example, the resource size classifier 202 can be configured to classify reserves based on an estimated OUP or remaining OIP of the reserves. In some embodiments, the resource size classifier 202 can classify reserves based on generally accepted measures of oil reserves, such as million barrels of oil (MMBO), billion stock tank barrels (BSTB), and the like.

The recovery potential classifier 204 is configured to classify reservoirs based on one or more recovery potential metrics or indicators. For example, the recovery potential classifier 204 can be configured to classify reserves based on a calculated GTI or RDQI score for the reserves. In some embodiments, the recovery potential classifier 204 can classify reserves into relative profitability categories, such as high or low, but other classification schemes are also possible.

The profitability classifier 206 is configured to classify reservoirs based on one or more profitability metrics or indicators. For example, the profitability classifier 206 can be configured to classify reserves based on a calculated IRR, ROR, or NPV of the reserves. In some embodiments, the profitability classifier 206 can classify reserves into relative profitability categories, such as high, medium, and low, but other classification schemes are also possible (e.g., top and bottom reservoirs, express profit amounts, etc.)

Figure 10:
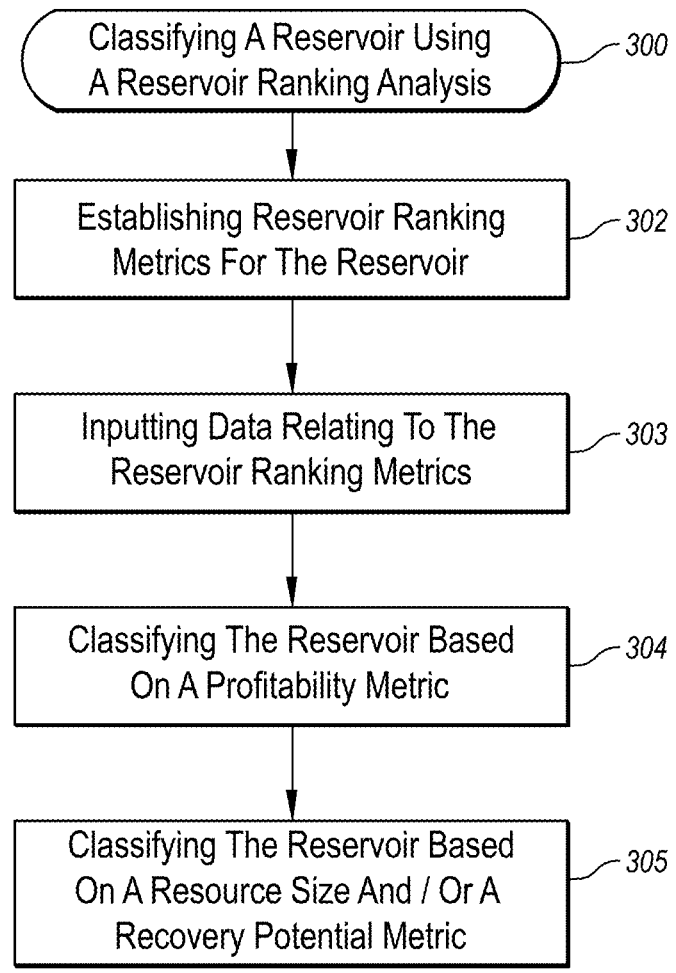
FIG. 10 is a flow diagram that illustrates exemplary acts in a method for performing a reserves ranking analytics (RRA) classification of petroleum reservoirs.
Figure 11:
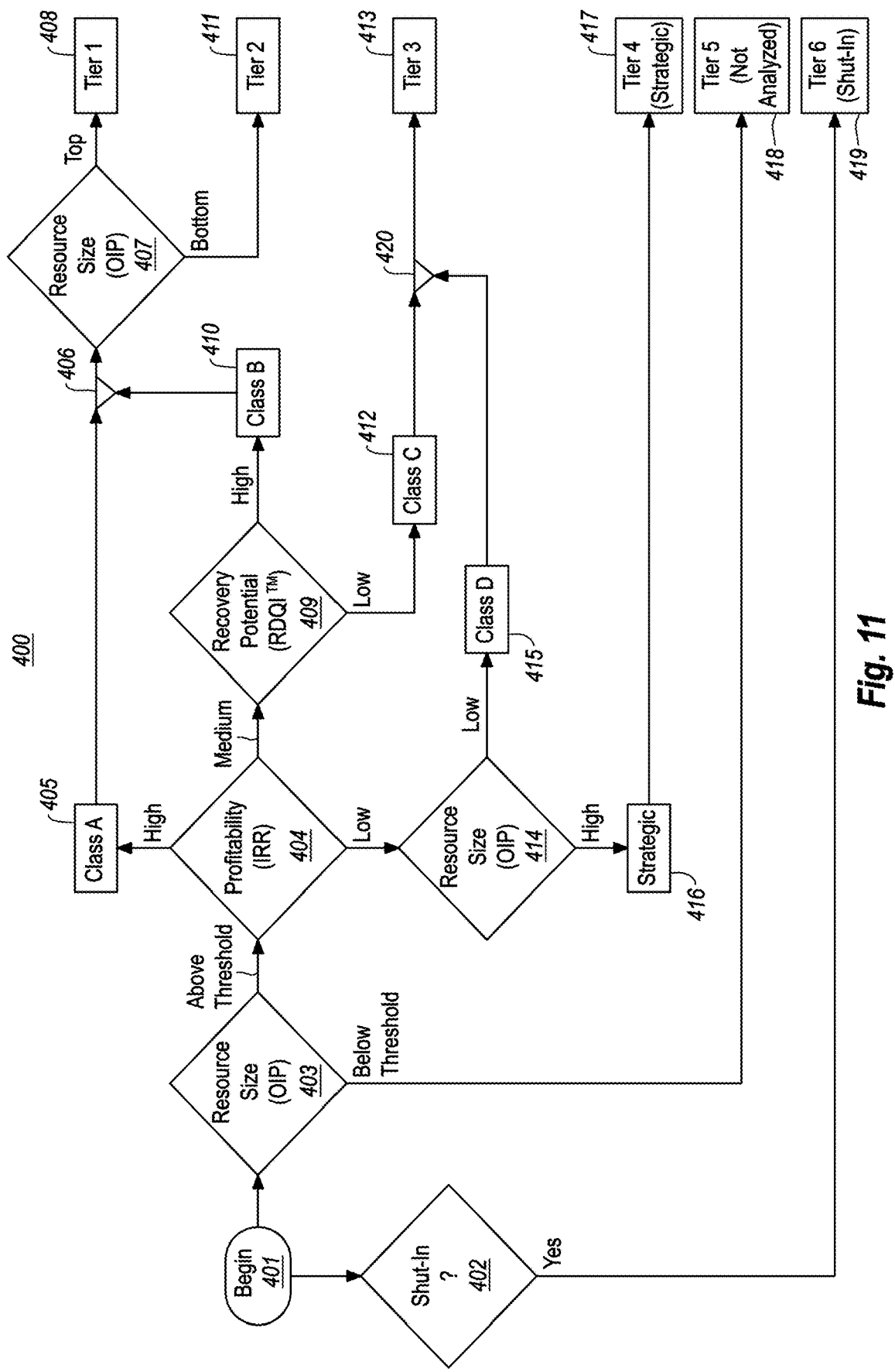
FIG. 11 is a flow chart for performing a reserves ranking analytics (RRA) classification of petroleum reservoirs.

FIG. 10 illustrates a method 300, according to one embodiment, for classifying a petroleum reservoir using reserves ranking analytics (RRA). FIG. 11 is a flow chart showing decisions made according to the disclosed methods, including the method illustrated in FIG. 10. Method 300 will be described with respect to the components of computer system 102 depicted in FIG. 1, including the components of the classification module 126 depicted in FIG. 9.

Method 300 includes an act 302 of establishing a plurality of reservoir classification metrics for the petroleum reservoir, including at least one metric in each of the following classification categories: (1) resource size, (2) recovery potential, and (3) profitability (act 302). For example, act 302 can include classification module 126 establishing/instantiating a resource size classifier 202, a recovery potential classifier 204, and a profitability classifier 206, which are each configured to classify petroleum reservoirs according to one or more metric. For instance, the resource size classifier 202 can classify reservoirs according to OIIP and/or remaining OIP metrics, the recovery potential classifier 204 can classify reservoirs according GTI and/or RDQI metrics, and the profitability classifier 206 can classify reservoirs according to IRR, ROR, and/or NPV metrics.

Method 300 also includes an act 303 of inputting into a computing system data relating to the plurality of reservoir classification metrics for the petroleum reservoir, at least some of the data being generated by at least one of (i) measuring a physical property of one or more producing oil wells and/or injector wells of the petroleum reservoir, (ii) taking and analyzing one or more core samples from the petroleum reservoir, or (iii) establishing a relationship between one or more different types of data from (i) or (ii). For example, act 303 can include at least one of sensors 104 inputting data directly into computer system 104 or receiving user input via user interface 108 inputting data into computer system 104. The data can then be analyzed by data analysis module 106 to establish reservoir metrics from the data.

Once the data is in place, method 300 includes an act of 304 classifying the petroleum reservoir as a high, medium, or low profitability reservoir based at least one metric in the profitability classification category (act 304). For example, act 304 can include the profitability classifier 206 classifying the reservoir based upon one or more of IRR, ROR, or NPV metrics. According to one embodiment, at least a portion of act 304 can be performed by a processor at the computing system.

In addition, method 300 includes an act 305 of classifying the petroleum reservoir based on at least one metric in one or more of the resource size classification category or the recovery potential classification category. For example, act 305 can include the resource size classifier 202 classifying the reservoir based upon one or more of OIW or remaining OIP metrics, and/or the recovery potential classifier 204 classifying the reservoir based upon one or more of GTI or RDQI metrics. According to one embodiment, at least a portion of act 305 can be performed by a processor at the computing system.

Through resource size classifier 202, recovery potential classifier 204, and profitability classifier 206, method 300 can provide a general framework for classifying the reservoirs. Method 300 can include a variety of additional acts or steps (not shown), such as performing initial filtering on reservoirs to determine whether or not to analyze each reservoir.

Method 300 (and the classifiers 202, 204, and 206) can be applied in a variety of ways to classify reservoirs into one or more of classes or tiers. For example, FIG. 11 illustrates a flow chart 400 of a specific embodiment of a process for performing an RRA classification of petroleum reservoirs, consistent with method 300, which classifies reservoirs into five classes and six tiers. As illustrated, flow chart 400 classifies reservoirs into tiers and/or classes based on one or more of the active status of the reservoir, the resource size of the reservoir (filtered by remaining OIP), the recovery potential of the reservoir (filtered by RDQI), and the profitability of the reservoir (filtered by IRR for drilling new wells). It will be appreciated by one of skill in the relevant art that the illustrated process can be repeated iteratively, with each iterative step used to classify a different single reservoir, or that the process can be completed on several reservoirs in parallel. According to one embodiment, one or more of the acts associated by flow chart 400 can be performed, at least in part, by means of a computing system.

The classification process can begin at block 401. The classification processes can initially determine whether a subject reservoir is active or shut-in (decision block 402) and/or whether the reservoir is of sufficient size for further analysis (decision block 403). As shown, if it is decided in decision block 402 that the reservoir is shut-in, the reservoir can be classified as a "Tier 6" 419 reservoir. The process can then end for that reservoir and proceed to analyze next reservoir (if any). Additionally, or alternatively, the process can determine if the reservoir is of sufficient size to proceed with further analysis. For instance, at decision block 403 (e.g., using resource size classifier 202) the remaining OIP of the reservoir can be used to differentiate the reservoir as one being subject to further analysis (e.g., a resource having a resource size above a given threshold OIP), or as a "Tier 5" 418 reservoir that is not analyzed (e.g., a resource having a resource size below the given threshold OIP). In some embodiments, the threshold OIP used by decision block 403 may be around 200 MMBO, but this figure can vary widely based on overall characteristics of the particular set of reservoirs being classified, and the goals of the classification. It will be appreciated that decision blocks 402 and 403 can be applied in any order, or can be independently applied with, or without, the other.

When the subject reservoir has a resource size that is large enough to trigger analysis, the classification process can apply a profitability filter to the reservoir at decision block 404 (e.g., using profitability classifier 206). As illustrated, the profitability filter can use IRR (e.g., the internal rate of return for drilling new wells) as the classification metric, but as mentioned other profitability measures can also be used (e.g., ROR, NPV). Decision block 404 can, in the illustrated embodiment, classify the reservoir as one having high profitability, medium profitability, or low profitability. In some embodiments, the profitability classifications can be based on a percentage of IRR (e.g., reservoirs having greater than about 150% IRR can be classified as high profitability, reservoirs having between about 21% IRR and about 149% IRR can be classified as medium profitability, and reservoirs having less than about 20% IRR can be classified as low profitability). Again, the particular cutoffs used when performing a profitability classification can vary based on the context and goals of the analysis.

High profitability reservoirs can be classified as "Class A" 405 reservoirs, and may represent fields that are generally low risk, high impact opportunities. These are reservoirs that should provide sustainable petroleum production in the long term, with proper reservoir management. As shown, the "Class A" 405 reservoirs can be combined at combination block 406 with "Class B" 410 reservoirs (which are addressed in more detail later) and can together be subjected to an additional filtering based on resource size (e.g., remaining OIP). At decision block 407 (e.g., using resource size classifier 202), for instance, "Class A" 405 and/or "Class B" 410 reservoirs that have the top resource sizes in the combined classes (the top 20%, for example) can be further classified as "Tier 1" 408 reservoirs. The remaining "Class A" 405 and/or "Class B" 410 reservoirs in the combined classes (the bottom 80%, for example) can be classified as "Tier 2" 411 reservoirs.

Returning to the profitability filter (decision block 404), medium profitability reservoirs can be further classified based on their recovery potential. In the illustrated embodiment, decision block 409 (e.g., using recovery potential classifier 204) can classify the medium profitability reservoirs into higher recovery potential "Class B" 410 reservoirs and lower recovery potential "Class C" 412 reservoirs using RDQI. For example, reservoirs having a RDQI score exceeding about 25 might be considered higher recovery potential reservoirs, and reservoirs having a RDQI score below about 25 might be considered lower recovery potential reservoirs. The use of RDQI is a choice among several other options (e.g., EURF, GTI), and like the other filters the particular threshold RDQI score used to differentiate reservoirs can vary. "Class B" 410 and "Class C" 412 reservoirs may represent fields that have profitable investment opportunities, but currently perform beneath "Class A" 405 reservoirs. For "Class B" 410 reservoirs, a higher RDQI score can indicate, a potential to be elevated to "Class A" 405 status through proper use of advanced technologies and/or best practices in reservoir management. For "Class C" 412 reservoirs, a lower RDQI score can indicate that opportunities may be more challenging to secure. As mentioned, "Class B" 410 reservoirs can be combined (at combination block 406) with "Class A" 405 reservoirs and classified as "Tier 1" 408 or "Tier 2" 411 reservoirs based on resource size (decision block 407). Any "Class C" 412 reservoirs can be combined at combination block 420 with "Class D" 415 reservoirs (which are addressed in more detail later) and can together classified as "Tier 3" 413 reservoirs.

Returning again to the profitability filter (decision block 404), low profitability reservoirs can be classified at decision block 414 (e.g., using resource size classifier 202) into "Class D" 415 or "Strategic" 416 classes based on their resource size. In one or more embodiments, for example, reservoirs having more than one Bstb remaining OIP can be classified as "Strategic" 416 reservoirs, while reservoirs having less than one Bstb remaining OIP can be classified as "Class D" 415 reservoirs. "Class D" 415 reservoirs may represent profitable investment opportunities, but those opportunities may be marginal compared to those of other classes. "Strategic" 416 reservoirs may represent less profitable investment opportunities relative to other classes, and may require high efforts in technology, reservoir management, and resource commitments to be elevated to "Class A" 405 reservoirs. As mentioned, "Class D" 415 reservoirs can be combined (at combination block 420) with "Class C" 412 reservoirs and classified as "Tier 3" 413. "Strategic" 416 reservoirs may be classified as "Tier 4" 417 reservoirs.

Accordingly, flow chart 400 illustrates one embodiment of a process for performing a RRA classification of petroleum reservoirs that classifies petroleum reservoirs into five classes (Class A through Class D and Strategic) and six tiers. Armed with these classifications, organizations can make decisions about where to allocate limited resources for reservoir development and maintenance.

Table 10 summarizes and details each of the five classes (or classifications), and indicates the key metrics that would identify reservoirs with each class (or classifications).

TABLE 10

Reservoir Classes

| Class | Key Metrics | Description |
|---|---|---|
| Class A: High Profitability | High IRR | Class A fields represent low risk, high impact opportunities. The highest performing reservoirs fall into this class. With proper reservoir management, Class A fields should typically provide sustainable production in the long term. |
| Class B: Medium Profitability, High Recovery Potential | Medium IRR High RDQI | Class B fields represent profitable investment opportunities, but currently perform beneath Class A fields. High RDQI scores indicate potential to be elevated into Class A through implementation of advanced technologies and best practices in reservoir management. |
| Class C: Medium Profitability, Low Recovery Potential | Medium IRR Low RDQI | Class C fields represent profitable investment opportunities, but currently perform beneath Class A fields. Low RDQI scores generally infer that opportunities may be more challenging. |
| Class D: Low Profitability | Low IRR Low ROIP | Class D fields may represent profitable investment opportunities, but appear marginal relative to the other classes. |
| Strategic: Low Profitability, High Resource Size | Low IRR High ROIP | Strategic fields may represent less profitable investment opportunities relative to the other classes. They may require high efforts in technology, reservoir management, and resource commitments to be elevated to Class A. |

Table 11 summarizes and details each of the six tiers, the classes that make up each tier (if any), and high-level description of the reservoirs in each tier.

TABLE 11

Reservoir Tiers

| Tier | Class | Description |
|---|---|---|
| Tier 1 | Class A Class B | Profitable reservoirs with the highest potential, including the largest reservoirs in terms of ROIP. |
| Tier 2 | Class A Class B | Profitable reservoirs with high recovery potential. While these reservoirs do not have the largest ROIP, they may contain significant potential and may be good candidates for further study and development. |
| Tier 3 | Class C Class D | Medium profitability (IRR) reservoirs that have a low recovery potential (RDQI), as well as low profitability (IRR) reservoirs that have a low resource size (ROIP). These reservoirs may have a lower priority for further study and development. |

TABLE 11-continued

Reservoir Tiers

| Tier | Class | Description |
| --- | --- | --- |
| Tier 4 (Strategic) | Strategic | Reservoirs having a low profitability score (IRR), but having a high resource size (ROIP). These reservoirs may have a lower priority for further study and development. |
| Tier 5 (Not Analyzed) | None | Reservoirs having a ROIP below a threshold that triggers analysis. These reservoirs may have a lower priority for further study and development. |
| Tier 6 (Shut-In) | None | Non-producing reservoirs. These reservoirs may have a lower priority for further study and development. |

As indicated in Table 11, some tiers represent an opportunity for further study. Further study may comprise an in-depth "reservoir management rating" (RMR) analysis. A comprehensive description of RMR is set forth in U.S. patent application Ser. No. 12/606,027, filed Oct. 26, 2009, and entitled "METHOD OF ASSESSING THE QUALITY OF RESERVOIR MANAGEMENT AND GENERATING A RESERVOIR MANAGEMENT RATING," which is incorporated herein in its entirety by reference.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of increasing petroleum recovery efficiency using reserves ranking analytics, the method comprising:
    establishing reservoir classification metrics for a plurality of petroleum reservoirs, including at least one metric in each of the following categories: (1) resource size, (2) recovery potential, and (3) profitability;
    measuring physical characteristics of each of the petroleum reservoirs using, or obtaining data of physical characteristics generated by, one or more sensors placed in and/or taking and analyzing one or more core samples from each of the petroleum reservoirs, the physical characteristics directly or indirectly relating to at least one of amount of oil, vertical and/or horizontal discontinuity, reservoir thickness, reservoir permeability, fluid viscosity, reservoir depth, and production of oil;
    determining, at least in part from data relating to the physical characteristics, at least one resource size metric for each of the petroleum reservoirs;
    determining, at least in part from data relating to the physical characteristics, at least one recovery potential metric for each of the petroleum reservoirs comprising a geo-technical index (GTI) determined based on the following:

$$GTI=(n_a*A)+(n_b*B)+(n_c*C)$$

where:
    A=a compartmentalization factor,
    B=a transmissibility index,
    C=a depth factor,
    $n_a$=weighting coefficient for the compartmentalization factor,
    $n_b$=weighting coefficient for the transmissibility index, and
    $n_c$=weighting coefficient for the depth factor;
    determining at least one profitability metric for each of the petroleum reservoirs;
    based on at least the resource size metric, the recovery potential metric, and the profitability metric for each of the petroleum reservoirs, classifying each petroleum reservoir into at least one classification relating to recovery efficiency of petroleum; and
    based at least in part on the at least one classification, manually or automatically adjusting operation of one or more reservoir production units of a petroleum reservoir having a higher classification than at least one other petroleum reservoir to increase petroleum recovery efficiency, wherein the reservoir production units are selected from producing oil wells, water injection wells, gas injection wells, heat injectors, or sub-components thereof, and wherein adjusting the operation of the one or more reservoir production units is selected from change in volume, change in pressure, change in temperature, change in well bore path, drilling one or more new production units, or shutting down one or more existing production units.

2. The method of claim 1, the at least one resource size metric including at least one of an oil initially in place (OIIP) metric or a remaining oil in place (ROIP) metric.

3. The method of claim 1, the at least one recovery potential metric additionally including a reservoir development quality index (RDQI) determined based on the following:

$$RDQI=(n_a*A)+(n_b*B)+(n_c*C)+(n_d*D)+(n_e*E)$$

where:
    A=geo technical index,
    B=crude quality,
    C=reserves,
    D=well productivity index,
    E=drilling costs,
    $n_a$=weighting coefficient for the geo technical index,
    $n_b$=weighting coefficient for the crude quality,
    $n_c$=weighting coefficient for the reserves,
    $n_d$=weighting coefficient for the well productivity index, and
    $n_e$=weighting coefficient for the drilling costs.

4. The method of claim 1, the at least one profitability metric includes at least one of internal rate of return, value for drilled wells, return of revenues, or net present value.

5. The method of claim 1, further comprising classifying, based on the resource size metric, the recovery potential metric, and the profitability metric for each of the petroleum reservoirs, each petroleum reservoir as belonging to one of the following classifications:
    a first classification characterized by high profitability;
    a second classification characterized by medium profitability and high recovery potential;
    a third classification characterized by medium profitability and low recovery potential;
    a fourth classification characterized by low profitability and low resource size; or
    a fifth classification characterized by low profitability and high resource size.

6. The method of claim 5, further comprising classifying a petroleum reservoir as a high profitability reservoir and classifying the petroleum reservoir based on at least one resource size metric as a tier 1 reservoir or a tier 2 reservoir.

7. The method of claim 5, further comprising classifying a petroleum reservoir as a medium profitability reservoir and classifying the petroleum reservoir based on at least one recovery potential metric as a high recovery potential reservoir or a low recovery potential reservoir.

8. The method of claim 5, further comprising classifying a petroleum reservoir as a high recovery potential reservoir and classifying the petroleum reservoir based on at least one resource size metric as a tier 1 reservoir or a tier 2 reservoir.

9. The method of claim 5, further comprising classifying a petroleum reservoir as a low recovery potential reservoir and classifying the petroleum reservoir as a tier 3 reservoir.

10. The method of claim 5, further comprising classifying a petroleum reservoir as a low profitability reservoir and classifying the petroleum reservoir based on at least one resource size metric as having high resource size or low resource size.

11. The method of claim 10, wherein:
when the petroleum reservoir is classified as having low resource size, the method comprising classifying the petroleum reservoir as a tier 3 reservoir; or
when the petroleum reservoir is classified as having high resource size, the method comprising classifying the petroleum reservoir as a tier 4 reservoir.

12. A method of increasing petroleum recovery efficiency using reserves ranking analytics, the method comprising:
inputting into a computing system having a processor and system memory, reservoir classification metrics for a plurality of petroleum reservoirs, including at least one metric in each of the following categories: 1) resource size, 2) recovery potential, and 3) profitability;
measuring physical characteristics of the petroleum reservoirs using, or obtaining data of physical characteristics generated by, one or more sensors placed in and/or taking and analyzing one or more core samples from each of the petroleum reservoirs, the physical characteristics directly or indirectly relating to at least one of amount of oil, vertical and/or horizontal discontinuity, reservoir thickness, reservoir permeability, fluid viscosity, reservoir depth, and production of oil;
inputting into the computing system data relating to the physical characteristics of the petroleum reservoirs;
determining, by the computing system, at least in part from data relating to the physical characteristics, at least one resource size metric for each of the petroleum reservoirs; determining, by the computing system, at least in part from data relating to the physical characteristics, at least one recovery potential metric for each of the petroleum reservoirs comprising a reservoir development quality index (RDQI) determined based on the following:

$$RDQI=(n_a*A)+(n_b*B)+*C)+(n_d*D)+(n_e*E),$$

where:
A=a geo technical index,
B=a crude quality,
C=reserves,
D=a well productivity index,
E=drilling costs,
$n_a$=weighting coefficient for the geo technical index,
$n_b$=weighting coefficient for the crude quality,
$n_c$=weighting coefficient for the reserves,
$n_d$=weighting coefficient for the well productivity index, and
$n_e$=weighting coefficient for the drilling costs;
determining, by the computing system, at least one profitability metric for each of the petroleum reservoirs;

based on at least the resource size metric, the recovery potential metric, and the profitability metric for each of the petroleum reservoirs, classifying each petroleum reservoir into at least one classification relating to recovery efficiency of petroleum; and
based at least in part on the at least one classification, manually or automatically adjusting operation of one or more reservoir production units of a petroleum reservoir having a higher classification than at least one other petroleum reservoir to increase petroleum recovery efficiency, wherein the reservoir production units are selected from producing oil wells, water injection wells, gas injection wells, heat injectors, or sub-components thereof, and wherein adjusting the operation of the one or more reservoir production units is selected from change in volume, change in pressure, change in temperature, change in well bore path, drilling one or more new production units, or shutting down one or more existing production units.

13. The method of claim 12, the at least one resource size metric including at least one of an oil initially in place (OIIP) metric or a remaining oil in place (ROIP) metric.

14. The method of claim 12, wherein the geo-technical index (GTI) component of the RDQI is determined based on the following:

$$GTI=(n_a*A)+(n_b*B)+(n_c*C)$$

where:
A=a compartmentalization factor,
B=a transmissibility index,
C=a depth factor,
$n_a$=weighting coefficient for the compartmentalization factor;
$n_b$=weighting coefficient for the transmissibility index; and
$n_c$=weighting coefficient for the depth factor.

15. The method of claim 12, the at least one profitability metric includes at least one of internal rate of return, value for drilled wells, return of revenues, or net present value.

16. The method of claim 12, further comprising classifying, based on the resource size metric, the recovery potential metric, and the profitability metric for each of the petroleum reservoirs, each petroleum reservoir as belonging to one of the following classifications:
a first classification characterized by high profitability;
a second classification characterized by medium profitability and high recovery potential;
a third classification characterized by medium profitability and low recovery potential;
a fourth classification characterized by low profitability and low resource size; or
a fifth classification characterized by low profitability and high resource size.

17. The method of claim 16, further comprising a plurality of:
classifying a petroleum reservoir as a high profitability reservoir and classifying the petroleum reservoir based on at least one resource size metric as a tier 1 reservoir or a tier 2 reservoir;
classifying a petroleum reservoir as a medium profitability reservoir and classifying the petroleum reservoir based on at least one recovery potential metric as a high recovery potential reservoir or a low recovery potential reservoir;
classifying a petroleum reservoir as a high recovery potential reservoir and classifying the petroleum reservoir based on at least one resource size metric as a tier 1 reservoir or a tier 2 reservoir;

classifying a petroleum reservoir as a low recovery potential reservoir and classifying the petroleum reservoir as a tier 3 reservoir; or classifying a petroleum reservoir as a low profitability reservoir and classifying the petroleum reservoir based on at least one resource size metric as having high resource size or low resource size, wherein when the petroleum reservoir is classified as having low resource size the method comprising classifying the petroleum reservoir as a tier 3 reservoir, wherein when the petroleum reservoir is classified as having high resource size the method comprising classifying the petroleum reservoir as a tier 4 reservoir.

18. The method of claim 12, wherein:

$n_a = n_b = n_c = n_d = n_e$ or $n_c = 2*n_a, n_c = 2*n_b, n_c = 2*n_d,$ or $n_c = 2*n_e;$ or $n_c = 3*n_a, n_c = 3*n_b, n_c = 3*n_d,$ or $n_c = 3*n_e;$ or $n_b = 2*n_a, n_b = 2*n_c, n_b = 2*n_d,$ or $n_b = 2*n_e;$ or $n_c = 0$.

19. A method of increasing petroleum recovery efficiency by implementing operational adjustments to petroleum reservoir(s) having a highest-tiered classification than other petroleum reservoir(s) based on a systematic classification of the petroleum reservoirs using reserves ranking analytics, the method comprising:

measuring physical characteristics of each of a plurality of petroleum reservoirs using, or obtaining data of physical characteristics generated by, one or more sensors placed in and/or taking and analyzing one or more core samples from each of the petroleum reservoirs, the physical characteristics directly or indirectly relating to at least one of amount of oil, vertical and/or horizontal discontinuity, reservoir thickness, reservoir permeability, fluid viscosity, reservoir depth, and production of oil;

classifying each petroleum reservoir as (i) active or (ii) shut-in based on the corresponding physical characteristics of each petroleum reservoir;

determining a resource size metric for each active petroleum reservoir based on the corresponding physical characteristics, wherein the resource size metric comprises an estimate of remaining oil in place (ROIP);

identifying, based on the corresponding estimate of ROIP, a first subset of active petroleum reservoirs exceeding a predetermined ROIP threshold;

determining a profitability metric for each active petroleum reservoir in the first subset, the profitability metric comprising an initial rate of return (IRR) value for drilling one or more new wells at the corresponding active petroleum reservoir;

applying a profitability filter to the first subset of active petroleum reservoirs to classify each active petroleum reservoir as having one of high profitability, medium profitability, or low profitability;

classifying each high profitability reservoir as a Class A petroleum reservoir;

determining a recovery potential metric for each medium profitability petroleum reservoir based on the corresponding physical characteristics, wherein the recovery potential metric comprises a reservoir development quality index (RDQI) score;

classifying the medium profitability petroleum reservoirs as having a high RDQI score or a low RDQI score;

classifying each medium profitability petroleum reservoir having a high RDQI score as a Class B petroleum reservoir;

defining a second subset of petroleum reservoirs consisting of each Class A reservoir and each Class B reservoir;

ranking the second subset based on the corresponding estimate of ROIP;

classifying Tier 1 petroleum reservoirs based on the ranking, the Tier 1 petroleum reservoirs consisting of a portion of the second subset having a high estimate of ROIP; and based on the classifying of the Tier 1 petroleum reservoirs, manually or automatically adjusting operation of one or more reservoir production units of a Tier 1 petroleum reservoir to increase petroleum recovery efficiency, wherein the reservoir production units are selected from producing oil wells, water injection wells, gas injection wells, heat injectors, or sub-components thereof, and wherein adjusting the operation of the one or more reservoir production units is selected from change in volume, change in pressure, change in temperature, change in well bore path, drilling one or more new production units, or shutting down one or more existing production units.

\* \* \* \* \*

UNITED STATES PATENT AND TRADEMARK OFFICE
CERTIFICATE OF CORRECTION

PATENT NO. : 10,915,847 B1
APPLICATION NO. : 15/914712
DATED : February 9, 2021
INVENTOR(S) : Saleri et al.

Page 1 of 1

It is certified that error appears in the above-identified patent and that said Letters Patent is hereby corrected as shown below:

On the Title Page

Item (57), Abstract, Line 4, change "or modifications" to –or more modifications–

Page 2
Item (56), References Cited, Other Publications, change "U.S. Appl. No. 15/359,604, filed March 20, 2019, Vajargah" to –U.S. Appl. No. 16/359,604, filed March 20, 2019, Vajargah–

Page 3
Item (56), References Cited, Other Publications, change "U.S. Appl. No. 15/618,890, filed June 9, 2017, Notice of Allowanced dated Jun. 24, 2019" to –U.S. Appl. No. 15/618,890, filed June 9, 2017, Notice of Allowance dated Jun. 24, 2019–

In the Specification

Column 8
Line 19, delete "on"

Column 17
Line 27, change "metric" to –metrics–
Line 30, change "according GTI" to –according to GTI–
Line 50, change "based" to –basing–

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*